United States Patent [19]
Kline et al.

[11] Patent Number: 5,666,120
[45] Date of Patent: Sep. 9, 1997

[54] DETECTOR APPARATUS

[75] Inventors: Chris R. Kline, Pepperell, Mass.;
Bruce A. Ricker, Penacook, N.H.;
Hans A. Kvinlaug, Bradford, Mass.;
Craig R. Autio, Orange, Mass.;
Subhash C. Sakar, Amhurst, N.H.;
Leonard J. Umina, Marlboro, Mass.

[73] Assignee: Whistler Acquisition Corporation, Boston, Mass.

[21] Appl. No.: 241,593

[22] Filed: May 12, 1994

Related U.S. Application Data

[63] Continuation-in-part of Ser. No. 231,400, Apr. 22, 1994, abandoned.

[51] Int. Cl.[6] .................................................. G01S 7/40
[52] U.S. Cl. ................................... 342/20; 342/168
[58] Field of Search ........................... 342/20, 54, 13, 342/168; 340/936; 356/28; 73/488

[56] References Cited

U.S. PATENT DOCUMENTS

| | | | |
|---|---|---|---|
| 4,315,261 | 2/1982 | Mosher | 342/20 |
| 4,375,640 | 3/1983 | Harvey | 342/93 |
| 4,398,196 | 8/1983 | Wiegand | 342/13 |
| 4,571,593 | 2/1986 | Martinson | 343/783 |
| 4,581,769 | 4/1986 | Grimsley et al. | 455/226 |
| 4,626,857 | 12/1986 | Imazeki | 342/20 |
| 4,630,054 | 12/1986 | Martinson | 342/20 |
| 4,668,952 | 5/1987 | Imazeki et al. | 342/20 |
| 4,698,632 | 10/1987 | Baba et al. | 342/17 |
| 4,709,407 | 11/1987 | Baba | 455/226 |
| 4,719,462 | 1/1988 | Hawkins | 342/20 |
| 4,743,908 | 5/1988 | Brassfield et al. | 342/113 |
| 4,939,521 | 7/1990 | Burin | 342/20 |
| 4,952,936 | 8/1990 | Martinson | 342/20 |
| 4,961,074 | 10/1990 | Martinson | 342/20 |
| 5,068,663 | 11/1991 | Valentine et al. | 342/20 |
| 5,083,129 | 1/1992 | Valentine et al. | 342/20 |
| 5,115,247 | 5/1992 | Thue | 342/201 |
| 5,146,226 | 9/1992 | Valentine et al. | 342/20 |
| 5,146,227 | 9/1992 | Papadopoulos | 342/20 |
| 5,151,701 | 9/1992 | Valentine et al. | 342/20 |
| 5,164,734 | 11/1992 | Fredericks et al. | 342/172 |
| 5,191,348 | 3/1993 | Brocia et al. | 342/173 |
| 5,206,500 | 4/1993 | Decker et al. | 250/214 R |
| 5,206,651 | 4/1993 | Valentine et al. | 342/20 |
| 5,239,296 | 8/1993 | Jenkins | 342/20 |
| 5,268,689 | 12/1993 | Ono et al. | 342/20 |
| 5,305,007 | 4/1994 | Orr et al. | 342/20 |
| 5,315,302 | 5/1994 | Katsukura et al. | 342/20 |

OTHER PUBLICATIONS

Whistler 1170 SW Laser Radar Detector Brochure.
Whistler 1190 SW Laser Radar Detector Brochure.
27 page brochure entitled Whistler, Advanced Technology Series, Jul. 1993.
Whistler Brochure #1130, Radar–Laser Detector featuring Wideband KA Technology, Jul. 1993.
Whistler Brochure #1250, Radar–Laser Detector with Superwideband 2.6, Jul. 1993.
Whistler Brochure #1270, Radar–Laser Detector, with Superwideband 2.6, Jul. 1993.
Whistler Brochure #1290, Nondetectible Radar–Laser Detector, Jul. 1993.

*Primary Examiner*—Daniel T. Pihulic
*Attorney, Agent, or Firm*—Hale and Dorr LLP

[57] ABSTRACT

Apparatus for detecting the presence of a speed detection system includes a microcontroller, a laser detector circuit coupled to the microcontroller, a radar detector circuit coupled to the microcontroller and a display coupled to the microcontroller, wherein the microcontroller receives signals from the laser detector and radar detector circuits and in response to the signals fed thereto, the microcontroller provides an output signal indicating which of the laser and radar detector circuits fed a signal thereto.

18 Claims, 16 Drawing Sheets

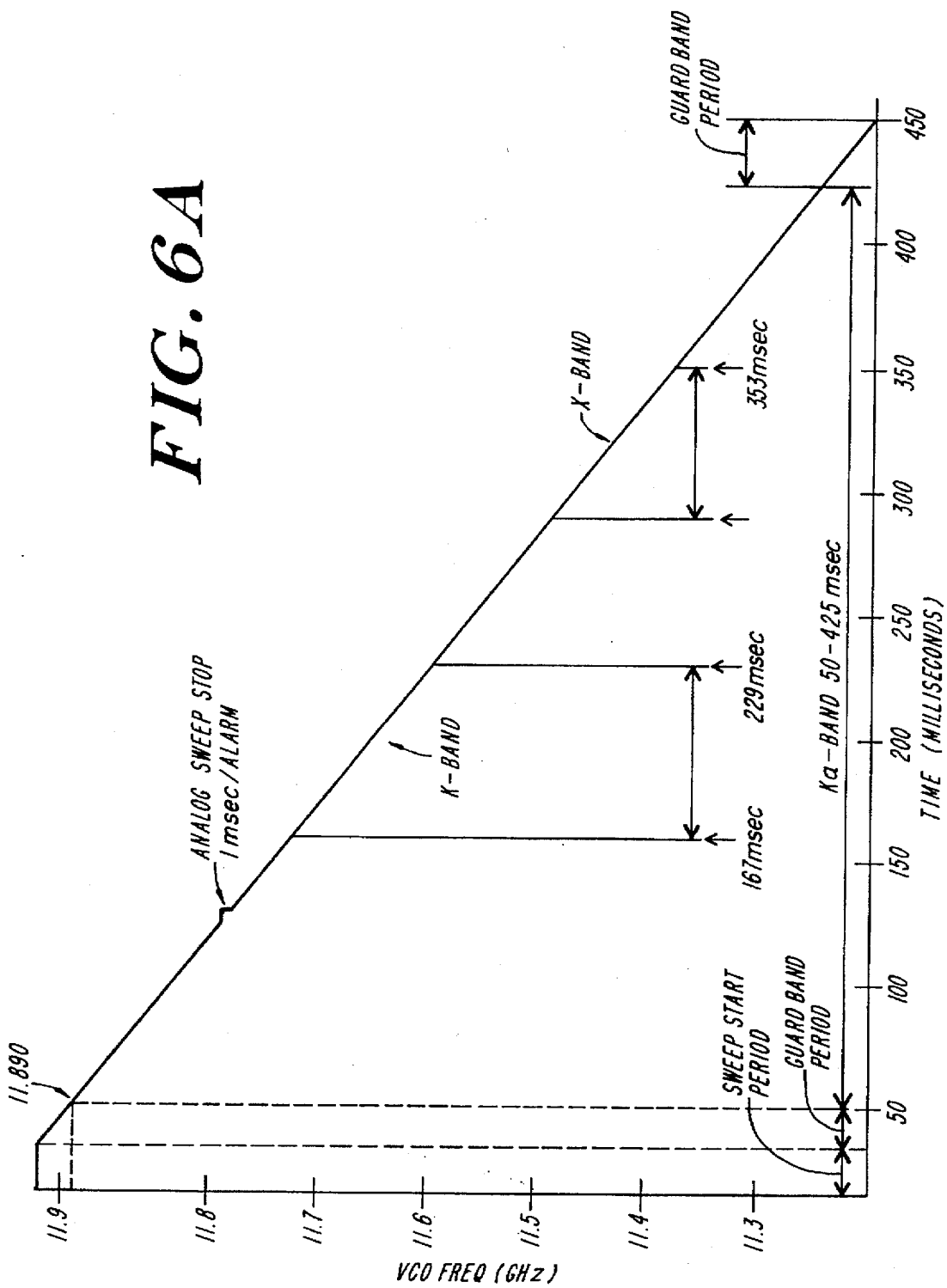

DETECTOR APPARATUS

RELATED APPLICATIONS

This Application is a Continuation-In-Part of application Ser. No. 08/231,400 filed Apr. 22, 1994, now abandoned.

FIELD OF THE INVENTION

This invention relates to detectors and more particularly to vehicle speed sensing systems.

BACKGROUND OF THE INVENTION

As is known in the art, speed detection systems may be used to determine the speed of moving objects, such as ground based or airborne motor vehicles for example. It is often desirable for the operator of the moving vehicle to know when the speed of the vehicle is being measured. For example, it may be desirable for an operator of a moving automobile to know when the speed of the automobile is being detected by a speed detection system.

As is also known, such speed detection systems may utilize either radar or laser devices in their operation. A speed detection system which utilizes radar may generally be referred to as a so-called radar gun. Radar guns typically include a microwave signal source which emits a signal having a frequency in either the X, K or Ka frequency regions of the electromagnetic spectrum. Furthermore, radar guns may emit signals in either a continuous or a pulsed mode.

A laser speed detection system or so-called laser gun, on the other hand, includes a laser which is a device that converts input power into a very narrow, intense beam of coherent energy at a single optical frequency, generally, but not necessarily, within the visible to infrared frequency region of the electromagnetic spectrum. Like radar guns, laser guns may also operate either continuously or in a pulsed mode. Laser guns generally operate in a pulsed mode due to input power requirements, cooling problems, and other considerations of the laser. The pulse width of the output of a pulsed laser is typically on the order of nanoseconds or picoseconds.

As is also known, there exists two particular classes of detecting systems generally referred to as radar detectors and laser detectors. A radar detector is a device used to detect the presence of a radar gun. A laser detector, on the other hand, is a device used to detect the presence of a laser gun. Typically, devices which detect the presence of radar guns are unable to detect the presence of laser guns. Similarly, devices capable of detecting the presence of laser guns are unable to detect the presence of radar guns.

Radar detectors typically detect signals having frequencies in the X-band, K-band and Ka-band frequency ranges. Such radar detectors often include a fixed frequency oscillator which generates a signal in the X-band frequency range. The so-called third harmonic of some X-band signals, however, fall generally within the Ka-band frequency range. Thus, one problem with conventional radar detectors which detect signals in the Ka-band frequency range is that such radar detectors may provide an alarm in response to the third harmonic signal of the fixed frequency oscillator of a nearby radar detector rather than in response to a signal emitted from a radar gun. This is generally referred to as a "false alarm" or simply "falsing."

For example, the third harmonic signal of a fixed frequency dielectric resonant oscillator (DRO) having a fundamental signal at a frequency of 11.550 GHz is a signal having a frequency of 34.650 GHz. Thus, conventional radar detectors having Ka-band detection capability detect the 34.650 GHz signal and sound false alarms in response thereto.

Laser detectors also have problems with sounding false alarm signals in response to light signals emitted from sources other than laser guns. Laser detectors may also pose an additional problem in that they may be expensive, and may require accurate or pre-determined alignment or positioning of the laser detector within the path of a laser beam in order to function properly. Such systems are thus impractical for use by personnel on moving airborne and ground-based vehicles.

It would, therefore, be desirable to provide a detection device which detects the presence of both laser and radar speed detection systems and which is able to distinguish between signals provided from speed detection systems and signals provided from other detection devices such as other radar detectors.

SUMMARY OF THE INVENTION

In accordance with the present invention, a detector device includes a microcontroller having coupled thereto a laser detector a radar detector and a display. The microcontroller receives signals from the laser and radar detectors and provides an output signal to the display indicating which of the detectors fed a signal thereto. With this particular arrangement, a detector which detects signals emitted from both radar and laser guns is provided. The detector device may further include a housing in which the microcontroller, radar detector and laser detector are disposed with the radar detector being disposed above the laser detector. The laser detector includes a lens array positioned in front of a detector to thus provide a laser detector having a relatively wide field of view and higher sensitivity with minimal costs. The lens array may be provided as a high optical gain lens array which provides amplified signals to the detector which may for example be provided as a single photodiode. The detector converts the light signals fed thereto to electrical signals which are fed to an analog signal processing circuit. The analog signal processor circuit may be provided to maximize gain and minimize noise of electrical signals prior to feeding the signal to a digital output circuit. The radar detector includes a voltage controlled oscillator (VCO) coupled to a first mixer. The VCO provides a swept frequency local oscillator (LO) signal to the mixer to provide a pair of signals in a first intermediate frequency (IF) range in response to a single signal emitted from a radar gun. The pair of first IF signals are fed to a second mixer. A second LO signal source provides a second LO signal at a first discrete frequency to an LO input port of the second mixer. The second LO signal and the pair of first IF signals are combined in the second mixer to provide a pair of IF signals in a second IF frequency range. In response to a signal from the microcontroller at a predetermined time, the second LO source provides a second LO signal at a second discrete frequency. The second LO signal at the second discrete frequency is fed to the LO port of the second mixer. The second mixer combines the LO signal at the second discrete frequency with a first IF signal to provide a third IF signal in the second IF frequency range. Thus three signals in the second IF frequency range are provided from the second mixer. The three IF signals may be used in a frequency band identification scheme to thus allow the microcontroller to correctly identify the frequency band of the signal emitted from the radar gun. The first mixer may be provided having an antiparallel diode pair fed through a pair of co-planer waveguide transmission lines coupled to RF and LO signal ports of the mixer. The co-planar waveguide transmission lines provide LO leakage signals having an orthogonal phase relationship at the RF port of the mixer. Thus, local oscillator signals propagating toward the RF port are cancelled. This renders the radar detector non-detectable by receiver circuits which are provided to detect the presence of a radar detector. Furthermore, the radar detector local oscillator signal source may be fixed tuned to thus detect the presence of such receiver circuits. When the presence of such a receiver circuit is detected, the radar detector of the present invention provides an alarm signal and changes the frequency of the VCO signal source to a frequency which is outside the frequency range detectable by the receiver circuit. The radar detector periodically checks for the existence of such receiver circuits. If a receiver circuit is detected, the microcontroller changes the frequency of the VCO signal to thus "hide" the local oscillator signal until such time that the receiver circuit is no longer detected. The radar detector may optionally include a vehicle on board radar detector circuit which decodes signals provided from collision avoidance systems and thus minimizes the number of undesirable false alarm signals which are emitted from the radar detector in response to signals received from such collision avoidance systems.

In accordance with a further aspect of the present invention a method of verifying the source of a received laser pulse includes the steps of receiving a first signal pulse, receiving a second signal pulse, comparing the time elapsed between receiving the first and second signal pulses with a first threshold value and comparing the number of pulses received within a predetermined time period with a second threshold value. With this particular technique, a method of minimizing the number of false alarms generated by a laser detector in response to electromagnetic interference or other extraneous optical signals is provided. By counting the number of pulses and the elapsed time between received pulses the periodicity and thus the so-called signature of the laser signal source is determined. Thus, a laser detector operating in accordance with this technique is able to distinguish a laser signal pulse emitted from a laser Sun from a laser pulse generated from other sources.

BRIEF DESCRIPTION OF THE DRAWINGS

The foregoing features of this invention as well as the invention itself may be more fully understood from the following detailed description of the drawings in which

FIGS. 6 and 6A are plots of frequency vs. time illustrating the relative timing of detected signals in the X, K and Ka frequency bands;

DESCRIPTION OF THE PREFERRED EMBODIMENTS

Figure 1:
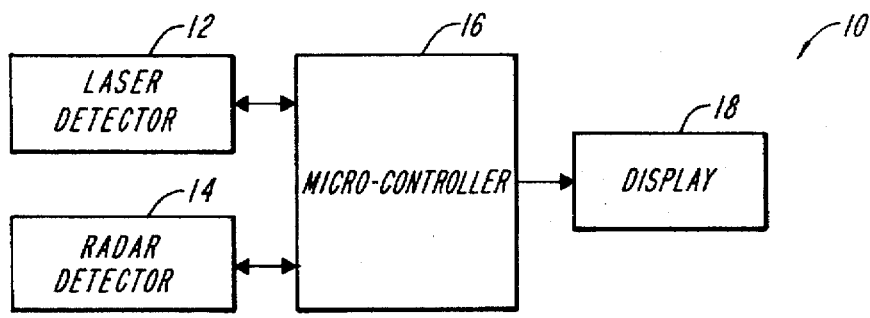
FIG. 1 is a block diagram of a combination radar/laser detector system.

Referring now to FIG. 1, a combination laser/radar detector 10 includes a laser detector circuit 12 and a radar detector circuit 14. Laser detector 12 and radar detector 14 are each coupled to a microcontroller 16. Microcontroller 16 receives signals fed thereto from each of the laser and radar detectors 12, 14 and in response thereto microcontroller 16 provides control signals to the laser and radar detectors and to a display 18.

Display 18 may include for example a panel of light emitting diodes (LEDs). Alternatively or in addition thereto, display 18 may include a liquid crystal display (LCD) a vacuum fluorescent (VF) or an LED segment display and the corresponding driver circuits. Those of ordinary skill in the art will recognize, of course, that other types of displays may also be used.

Figure 1A:
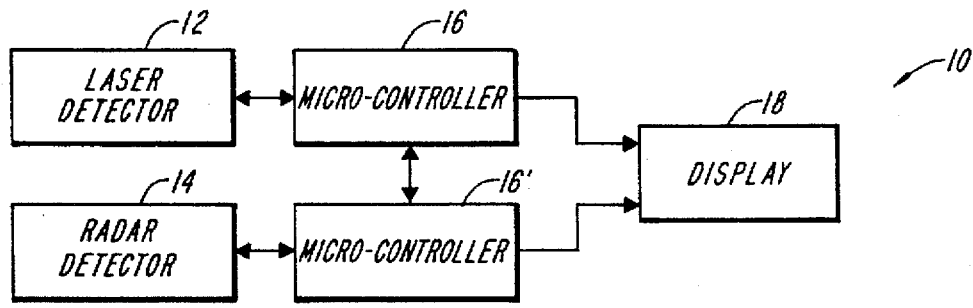
FIG. 1A is a block diagram of a combination laser/radar detector system including a pair of microprocessors.

It should be noted that microcontroller 16 is here shown as a single microcontroller coupled to both the laser and radar detectors 12, 14. As shown in FIG. 1A, however, in an alternate embodiment of detector system 10 a pair of microcontrollers 16, 16' may be provided with a first one of the pair being coupled to a first one of the laser and radar detectors 12, 14 and a second one of the pair of microcontrollers being connected to a second one of the laser and radar detectors 12, 14. The choice between using a single microcontroller or a pair of microcontrollers may be made according to a variety of factors including but not limited to the cost of manufacturing the detector system 10 having one microcontroller compared with the cost of manufacturing the detector system 10 having a plurality of separate microcontrollers.

Additionally, in determining whether to provide the system having a single or multiple processors, considerations such as the speed of the microprocessor relative the signal processing requirements for a so-called radar detector detector mode and the amount of user input/output interaction should be taken into account. Another factor to consider is the amount of signal processing overhead required to provide visual and sound indicators to a user via LEDs, LCDs and a tone generator for example.

Since laser guns are less common and the reaction time thereto must be faster, in those cases where both laser and radar alarm signals are generated, the laser alarm signals have priority over the radar signals.

Figure 1B:
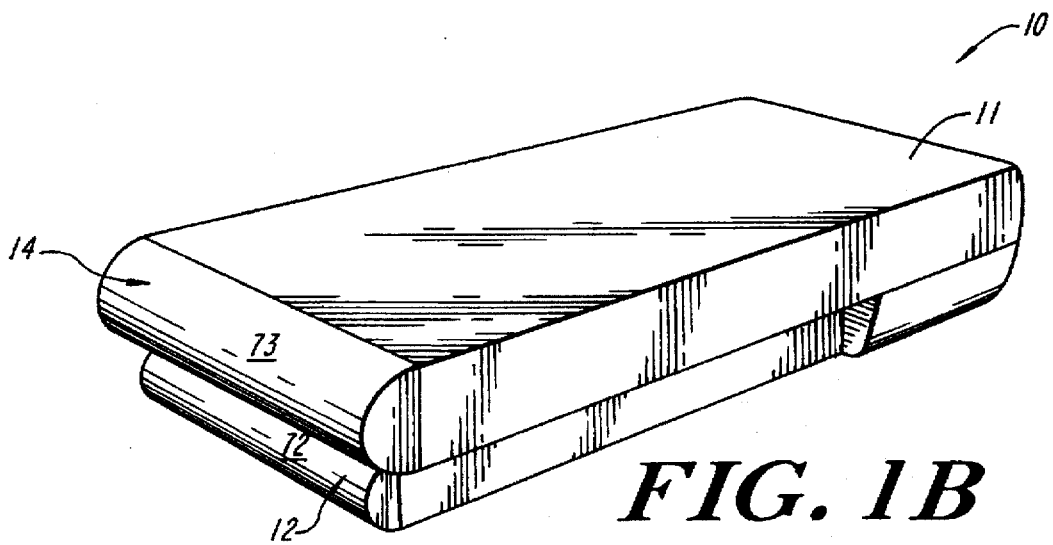
FIG. 1B is a perspective view of a combination radar/laser detector system disposed in a housing.

Referring now to FIG. 1B detector 10 is shown to further include a housing 11 in which the laser detector circuit 12, radar detector circuit 14, microcontroller 16 and display 18 are disposed. Since radar detector 14 protrudes farther from the housing than does laser detector 12, laser detector 12 is disposed below radar detector 14. If laser detector 12 were placed above radar detector 14 then any light rays emanating from a relatively low elevation may be obstructed by the radar detector 14 and thus would not be received by laser detector 12. Thus to avoid having any of the field of view of laser detector 12 blocked, laser detector 12 is disposed in the housing 11 below radar detector 14.

It should be noted, however, that in some applications it may be beneficial to dispose laser detector 12 above the radar detector 14. The particular placement of radar detector 12 relative to laser detector 14 should be made such that each detector 12, 14 is provided having an optimum field of view and minimum blockage or other interference from the other detector.

A first window 72 is disposed in front of laser detector 12 and a second window 73 is disposed in front of radar detector 14. Windows 72, 73 should be provided from a material which is substantially transparent to signals having frequencies in the regions of interest in the electromagnetic spectrum. Window 72 may also be provided from a material which filters light in the lower frequency ranges to thus reduce the effect of background light such as sunlight and streetlights.

Figure 2:
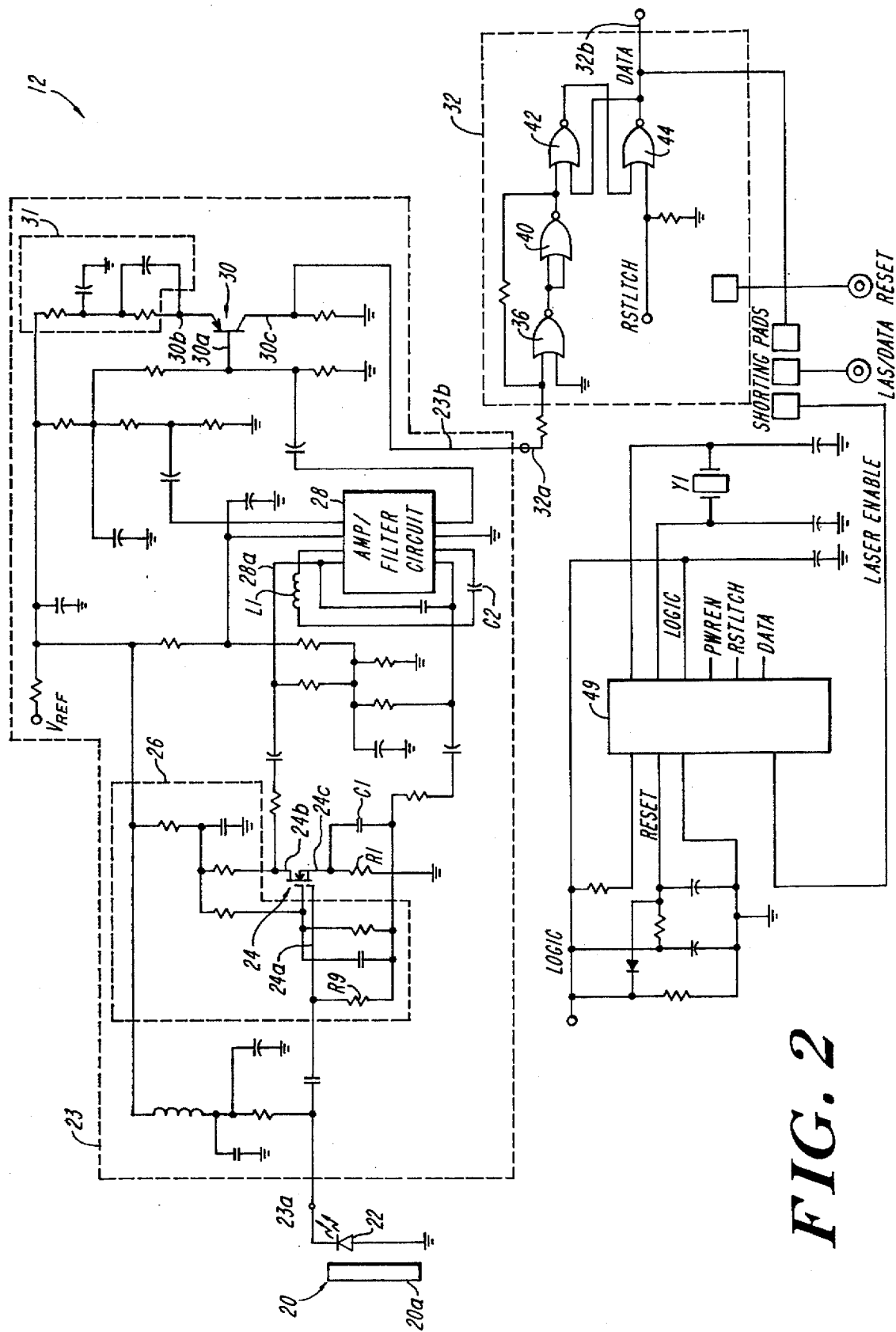
FIG. 2 is a diagram of a laser detector which may be used in the system of FIG. 1.

Referring now to FIG. 2, laser detector circuit 12 includes a lens 20 disposed about a photodiode detector 22. Lens 20 will be described in detail in conjunction with FIGS. 3–3C below. Suffice it here to say that lens 20 provides the laser detector 12 having a particular field of view such that laser beam incident on a surface 20a of lens 20 are focused on photodiode 22 such that photodiode 22 provides a signal in response thereto.

The detector signal corresponds to an electrical signal which here is provided as a current pulse which is fed to an analog signal processor circuit 23 at an input port 23a. The photocurrent is capacitively coupled to the input resistor to develop a signal voltage which is fed to the 1st gate of MOSFET 24 having a relatively high input impedance at a control electrode 24a. A second electrode 24b of transistor 24 is coupled through a DC bias circuit 26 to a first reference potential $V_{REF}$. A third electrode 24c of transistor 24 is coupled to a second reference potential, here provided as ground, through a resistor R1 and a by-pass capacitor C1.

Transistor 24 is here provided as a dual gate metal oxide field effect transistor (MOSFET) which may be of the type manufactured by Philips and identified as part number BF998 for example. Those of ordinary skill in the art will recognize of course that any type of transistor having similar electrical characteristics and capable of responding to the output signal from photodiode detector 22 may also be used. Such transistors include but are not limited to, high electron mobility transistors (HEMTs), bi-polar junction transistors (BJT) or any other type of transistor well known to those of ordinary skill in the art. It should be noted, however, that transistor 24 should be selected such that inclusion thereof does not significantly increase the noise figure (NF) of laser detector 12. For example transistor 24 is preferably provided having a noise figure of less than about 1 decibel (dB) at the operating frequencies of interest, a transfer admittance typically of about 24 milli siemens, an input capacitance at gate 24a typically of about 2.4 pico-Farads (pF) and a feedback capacitance of 25 femto-farads. Transistor 24 amplifies the voltage signal developed across resistor R9 and provides an amplified signal at drain electrode 24b.

The amplified signal is fed from drain electrode 24b to an input port 28a of an integrated video amplifier/filter circuit 28. Video amplifier/filter circuit 28 may, for example, be of the type manufactured by Signetics and Motorola and identified as part number NE-592. However any integrated amplifier/filter circuit having similar electrical characteristics may also be used. It should also be noted that a separate amplifier and filter circuit may be used to provide the overall gain and filter characteristics of integrated amplifier/filter circuit 28.

Amplifier/filter circuit 28 has coupled thereto external filter circuit components including an inductor L1 having a value typically of about 100 nano-Henries (nH) and a capacitor C2 having a value typically of about 100 pF. By appropriately coupling inductor L1 and capacitor C2 to circuit 28, circuit 28 may provide high-pass, low-pass or band-pass filter characteristics in addition to providing gain. In this particular embodiment, inductor L1 and capacitor C2 are coupled such that circuit 28 is provided having a band-pass filter characteristic. Thus, amplifier/filter circuit 28 rejects signals having frequencies above and below the band-pass region.

Here the band-pass frequency region is between 2.0 MHz and 80 MHz. Thus amplifier/filter circuit 28 limits bandwidth and thus noise to therefore increase the signal to noise ratio (SNR) of laser circuit 12.

Amplifier/filter circuit 28 then feeds a filtered and amplified signal to a base electrode 30a of a bipolar junction transistor (BJT) 30. An emitter electrode 30b of BJT 30 is coupled through a DC bias circuit 31 to the reference voltage $V_{REF}$. BJT 30 provides an amplified signal at a collector 30c which is coupled to output port 23b of analog signal processor circuit 23. Thus, BJT 30 provides voltage amplification to the signal pulse and reference voltage fed thereto at base electrode 30a. Collector electrode 30c provides translation of impulse signals to logic levels and discrimination to noise.

Output port 23b is coupled to a latch circuit 32 at an input port 32a. Analog processor 23 thus receives electrical signals fed thereto from photodetector 22 and provides an appropriately filtered and amplified electrical signal to latch circuit 32 at input port 32a.

It should be noted that processor circuit 23 is preferably disposed on a ground plane which acts as a shield and prevents extraneous external signals from interfering with or degrading the operation of processor 23.

Latch circuit 32 is here provided as a reset-set (RS) latch and may be provided, for example, from a plurality of logic gates. RS latch 32 is here provided from a plurality of complementary metal oxide semiconductor (CMOS) NOR logic gates 36–44. Logic gate 36 has a first input port coupled to the signal processing circuit output port 23b. A second input port of logic gate 36 is coupled to ground. Logic gate 36 feeds an output signal to a pair of input ports of logic gate 40. Logic gate 40 has an output port coupled to a first input port a logic gate 42. Logic gate 44 has a first input port coupled to the output port of logic gate 42 and a second input port coupled to a microcontroller. The microcontroller provides a reset signal RSTLTCH to the second input port of logic circuit 44. The output of logic circuit 44 is coupled to a second input port of logic circuit 42.

When latch circuit 32 receives a pulse from processor 23, a signal having a high logic level is provided at a latch circuit output port 32b. The latch circuit 32 output is held high until microcontroller 49 provides the reset signal LTCHRST to NOR gate 44.

Figure 3A:
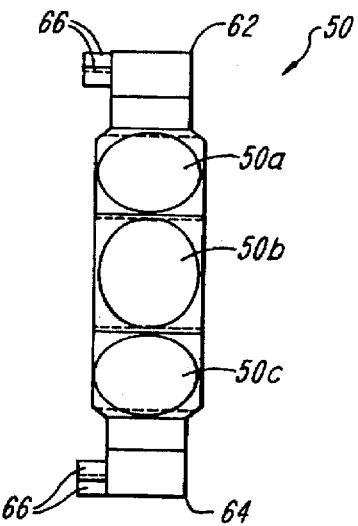
FIG. 3A is a front view of the lens array of FIG. 3 taken along lines 3A—3A.
Figure 3:
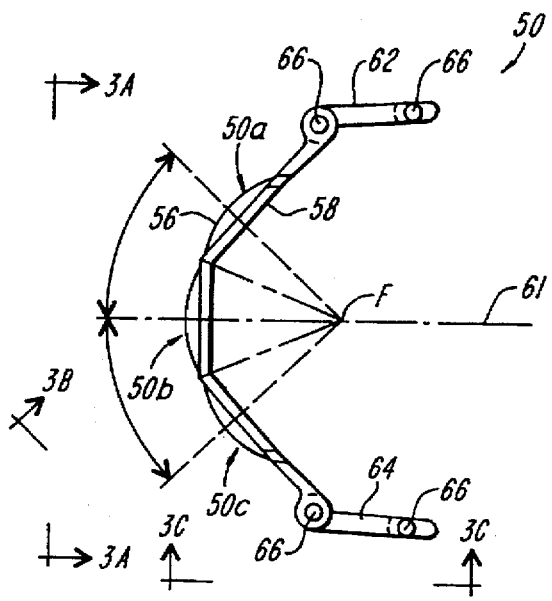
FIG. 3 is a top view of a lens array which may be used in the laser detector of FIG. 2.
Figure 3B:
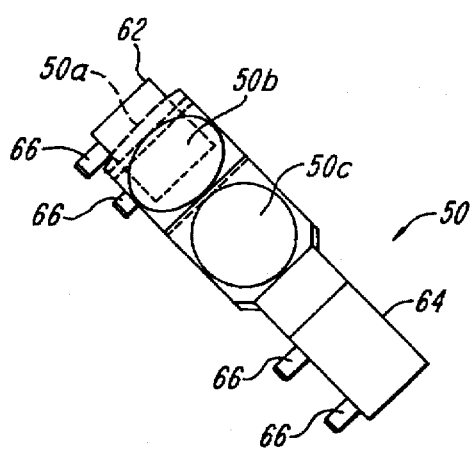
FIG. 3B is a front view of the lens array of FIG. 3 taken along lines 3B—3B.
Figure 3C:
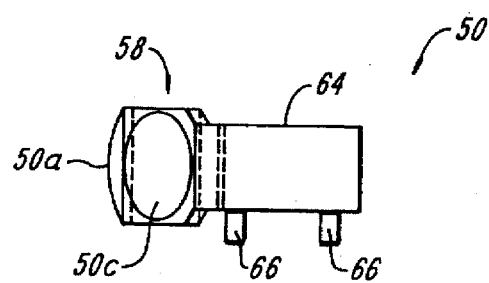
FIG. 3C is a side view of the lens array of FIG. 3 taken along lines 3C—3C.

Referring now to FIGS. 3–3C, in which like elements are provided having like reference designations throughout the several views, a lens array 50 which may be used in laser detection 12 of FIG. 2 for example, includes a plurality of lenses 50a, 50b and 50c. Each lens 50a–50c includes first and second opposing lens surfaces. Lens array 50 also includes a frame 58 having three apertures in which lenses 50a–50c are disposed.

Lens frame 58 includes a pair of arm regions 62, 64 each of which have a pair of mounting posts 66 (FIGS. 3B,3C) projecting from a first surface thereof. Mounting posts 66 are coupled to a printed circuit board and thus to housing 11 (FIG. 1B) to secure the lenses 50a, 50b, 50c in a predetermined position.

The lenses 50a, 50c are here disposed in the apertures of the frame 58 such that lenses 50a, 50c here respectively form angles alpha and beta with respect to a center line 61. The focal point of the lenses 50a–50c coincide at a point F at which a photodetector diode (70 FIG. 3D) will be disposed.

Lens 50a–50c may be made from a molded plastic material such as acrylic or any other material having like optical characteristics and may be manufactured using any well known manufacturing technique. The surface accuracy of lenses 50 should be selected to provide the detector having a desired sensitivity. One of ordinary skill in the art will know how to select a particular surface accuracy in combination with the other circuit components such that the laser system is provided having a predetermined amount of sensitivity.

Here alpha and beta are each 42 degrees. The particular angles were selected according to a variety of factors including but not limited to the size of the photodiode being used, the maximum allowable size of array 50 as limited by the desired size of the housing 11 (FIG. 1B), and the field of view which is desired to be covered. Theoretically, with this configuration of lens array, a single photodiode can cover a 180 degree field of view and a 360 degree field of view can be covered with two photodiodes and two arrays arranged in diametrically opposing directions as shown in FIG. 3E.

Those of ordinary skill in the art will recognize of course that angles other than 42 degrees could also be used dependent upon the particular packaging size constraints and the size and electrical characteristics of the photodiode used. Furthermore, in some applications it may be advantageous to use more or fewer than three lenses. For example, 4 or more lenses may be used to provide a lens array having a wider field of view than the present three lens array. Of course, predetermined package size, if the number of lenses is increased then the diameter of each lens should be concomitantly reduced to thus fit within the package size.

It should be noted however that since a blind spot may exist in the regions between the lenses 50a–50c an odd number of lenses may be preferred to thus avoid the possible existence of a blind spot along the center line of the lens array 50. In some applications, however, it may be preferred to have a blind spot along a centerline of the lens array 20'. Thus in such an application an even number of lenses spaced symmetrically about the centerline may be used.

Moreover, while lenses 50a–50c are here symmetrically disposed about centerline 61, lenses 50a–50c need not be symmetrically disposed. Also here each lens 50a, 50b, 50c is provided having a round shape, however, in some applications other shapes may be preferred. For example, the lenses 50a, 50b, 50c may be provided having any external shape if the surfaces of the lens are provided having appropriate shapes.

Center lens 50b is here provided having a substantially round shape and a diameter typically of about 0.342 inches (in). A first surface of lens 50b is provided having a spherical shape and more particularly is provided having a spherical radius typically of about 0.362 in. A second surface of the lens 50b is here provided having a substantially flat shape. Such a plano-convex shaped lens is preferably used to avoid excessive spherical aberration.

Side lenses 50a, 50c are provided having substantially round shapes. Each lens 50a, 50c has a diameter typically of about 0.342 in a first surface having a spherical shape with a spherical radius typically of about 0.394 and a second substantially flat surface opposite the spherical surface.

Each lens 50a–50c may be provided as a unitary piece or alternatively each lens may be provided from a plurality of separate lenses, each arranged to provide an overall lens. The particular number of pieces, materials and manufacturing techniques used to fabricate individual lenses 50a–50c and lens array 50 may of course be selected to provide lens array 50 as a low cost, durable lens array 50.

The photodiode includes as an integral part thereof a die and a lens having a hemispherical shape disposed about the die. Thus by taking into account refraction through the photodiode lens, lens array 50 was here provided having a relatively short focal length.

In the particular embodiment described herein, because of the electrical and physical characteristics of the diode, an increase or decrease in the circumferential length of lens array 50 would fail to substantially improve the performance of the laser detector. This is because the diode has limitations including a particular size of die which limits the field angle.

If, however, another photodiode having a photodiode lens with a larger diameter coupled thereto as an integral part of the photodiode and a larger die size were used, it may be advantageous to increase the number of lenses 50a–50c in lens array 50 (e.g. from 3 to 5) to provide a larger field of view. Furthermore, the ratio of the lens diameter to the lens focal length, generally referred to as the lens speed, has been optimized for this particular geometry and photodiode type. However, the particular lens speed and positioning of lens array 50 relative to the photodiode is selected to provide optimum performance and depends of course on the particular photodiode characteristics and the maximum allowable size of lens array 50.

Ideally, each lens 50a–50c in lens array 50 should be arranged along a line corresponding to the circumference of a circle having a particular radius. The center of the circle should correspond to the position at which the photodiode will be disposed. The total circumference may be computed as $2\pi R$ for a given radius, R and is equivalent to 360 mechanical degrees. The maximum angle covered by a single photodiode is 180 mechanical degrees. Two photodiodes will be required to cover 360°.

The maximum circumferential length along which the lenses 50a–50c should be disposed is predetermined and may be expressed in mechanical degrees. By dividing the number of lenses to be used in the lens array into the angle corresponding to the maximum circumferential length along which the lenses may be disposed, the angular positioning of each lens is provided. Thus where a predetermined number of lenses are used and the maximum circumferential length is known, the maximum diameter of each lens may be computed by dividing the number of lenses into the maximum circumferential length. Furthermore, such computation also provides angular spacing between the lenses which here corresponds to an angle of 42 degrees.

The particular spherical radius of each lens may be selected using conventional ray tracing techniques taking into account spherical aberrations resulting from the light passing through each of the curved surfaces. The total dispersion or spread of the image about the focal spot should not exceed the size of the photodiode at a particular preselected plane. Here the spherical radius of the center and side lenses have been optimized to provide lens array 50 having desirable performance characteristics. The spherical radius of lenses 50a–50c are adjusted such that the largest fraction of any off-axis ray bundles should reach the active area of the photodiode die, after being refracted through lens array 50 and the photodiode lens. It should be noted that the window 72 (FIG. 1B) should also be taken into account when optimizing the spherical radius of the lenses 50a–50c.

In this particular embodiment the response along the central axis is being maximized. It is desirable therefore to maximize the gain response on the center lens which is accomplished by maximizing the diameter of the center lens. The side lenses 50a, 50c are then provided having a diameter as large as possible after the diameter of the center lens 50b has been fixed. Thus this embodiment may be particularly useful when the laser signal to be detected is substantially along this axis.

In other applications, however, it may be desirable to provide each lens 50a–50c having equal diameters or even to provide the side lenses 50a, 50c having larger diameters than center lens 50b.

Figure 3D:
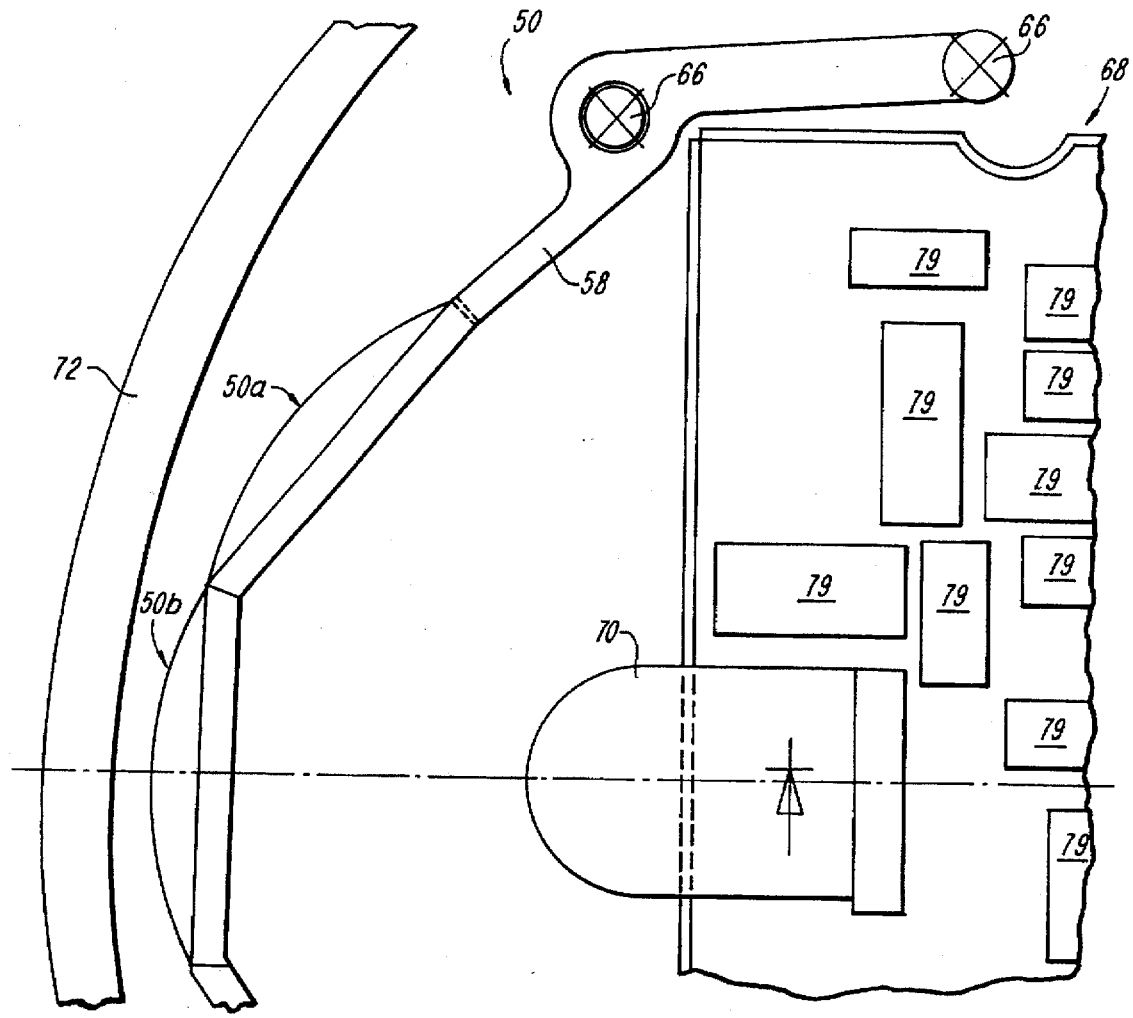
FIG. 3D is a schematic diagram of a printed circuit board on which a lens array and a photodetector are disposed.
Figure 3E:
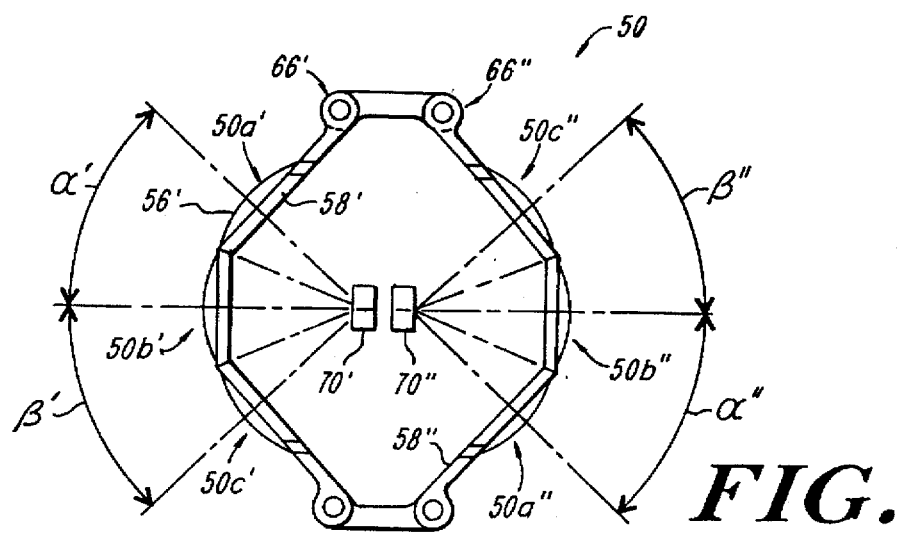
FIG. 3E is a top view of a lens array.

Referring now to FIG. 3D, a portion of lens array 50 is shown disposed on a printed circuit board 68 on which a photodetector 70 and a plurality of electrical components 79 are also disposed. A window 72 is disposed about an outer surface of the lens. Lens array 50 focuses light incident thereon onto the photodetector 70 such that photodetector 70 provides an electrical signal in response to the light signal fed thereto.

As mentioned above, lenses 50a, 50b are disposed in apertures of frame 58 having side sections 62, 64. Each side section 62, 64 has a pair of posts 66 projecting from a surface thereof. The printed circuit board 68 has a corresponding pair of holes in which the posts are disposed.

Posts 66 may be press fit to the printed circuit board and then fastened to the printed circuit board using a sonic welding technique or any technique well known to those of ordinary skill in the art.

Referring now to FIG. 3E a lens array 50' includes a first plurality of lenses 50a', 50b' and 50c' each having first and second opposing lens surfaces. Lenses 50a'–50c' are disposed in a frame 58'. Lens array 50' also includes a second plurality of lenses 50a", 50b" and 50c" each having first and second opposing lens surfaces. Lenses 50a"–50c" are disposed in a frame 58".

Frames 58', 58" each include mounting posts 66', 66" projecting from a first surface thereof. Mounting posts 66', 66" may be coupled to a printed circuit board and a housing secure the lenses 50a'–50c' and 50a"–50c" in a predetermined position as described above in conjunction with FIGS. 3–3D.

The lenses 50a', 50c' are disposed in the frame 58' such that lenses they respectively form angles α' and β' with respect to a center line 61'. The focal point of the lenses 50a'–50c' coincide at a point at which a photodetector diode 70' is disposed. Similarly, lenses 50a", 50c" are disposed in the frame 58" such that lenses they respectively form angles α" and β" with respect to center line 61'. The focal point of the lenses 50a"–50c" coincide at a point at which a photodetector diode 70" is disposed.

Lens 50a'–50c" may be made from a molded plastic material such as acrylic or any other material having like optical characteristics and may be manufactured using any well known manufacturing technique. The surface accuracy of the lenses 50a'–50c" should be selected to provide the detector having a desired sensitivity. One of ordinary skill in the art will know how to select a particular surface accuracy in combination with the other circuit components such that the laser system is provided having a predetermined amount of sensitivity.

Theoretically, by disposing photodiodes 70' and 70" and lenses 50a'–50c' and 50a"–50c" in diametrically opposing directions as shown in FIG. 3E, laser light can be detected over a 360 degree field of view.

Figure 4:
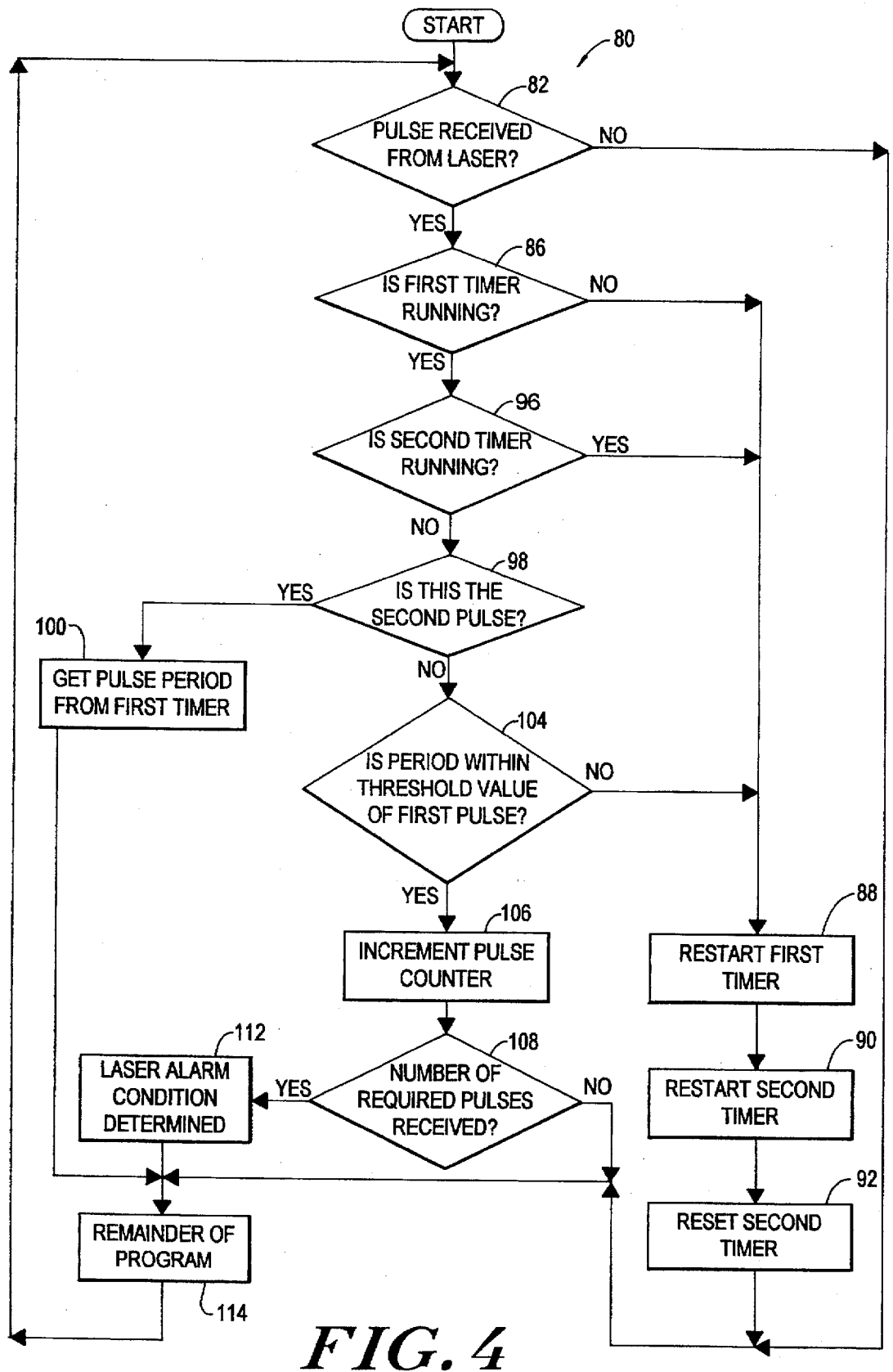
FIG. 4 is a flow diagram of a portion of the processing performed in the processor of FIG. 1 to provide an output on the display.

FIG. 4 shows a flow diagram of the processing performed in microcontroller 49 (FIG. 2) of detector module 12 (FIGS. 1 and 2) to produce an output on display 18 (FIG. 1). In the flow diagram, the rectangular elements (typified by element 100) herein denoted "processing blocks" represent computer software instructions or groups of instructions. The diamond shaped elements (typified by element 82) herein denoted "decision blocks" represent computer software instructions or groups of instructions which affect the execution of the computer software instructions represented by the processing blocks. The flow diagram does not depict syntax or any particular computer programming language. Rather, the flow diagram illustrates the functional information one skilled in the art requires to generate computer software to perform the processing required of microcontroller 49 (FIG. 1). It should be noted that many routine program elements such as initialization of loops and variables and the use of temporary variables are not shown.

Turning now to FIG. 4, after an initialization procedure is concluded the system implements a loop in which laser detector 12 waits to receiver laser pulses as shown in decision block 82. If no pulses were received then processing continues to the remainder of the program during which time user interfaces and the like are serviced as shown in processing block 114. In processing block 114, the program generates audio tones, drives display LEDs and senses switches for user input.

However, if pulses were received then a pair of timers are simultaneously started. The laser detector checks to see if a first one of the pair of timers is running as shown in decision block 86. If the first timer is not running, then the first and second timers are re-started as shown in processing blocks 88, 90.

The first and second timers run for predetermined periods of time which are selected based upon the characteristics of the laser gun. For example if the laser gun emits pulses at frequencies between 100 Hz and 1 KHz, then the first and second timers should preferably be provided having periods of ten (10) milliseconds (msecs) and one (1) msec respectively.

One msec is the period of time by which 1 KHz pulses are spaced, while ten msec is the period of time by which 100 Hz pulses are spaced. Thus, in this example where the laser gun emits pulses at frequencies between 100 Hz and 1 KHz, if the first and second timers each start at a time designated $T_0$ and another pulse is received before the 1 msec timer has expired then the frequency of repetition is over 1 KHz and the system can conclude that this laser pulse did not emanate from a laser gun having the predetermined characteristics.

Similarly, if a subsequent pulse arrives and the 1 msec timer has expired but the 10 msec timer has not yet expired then this indicates the repetition rate is less than 1 KHz but greater than 100 Hz. Thus in this case the system should recognize that the pulses are received from a laser gun.

If both timers have expired then the frequency is less than 100 Hz and the system can conclude that the pulses are not from a laser gun having the requisite characteristics. Thus if the pulse periods are too short (e.g. less than 1 msec) or the pulse periods are too long (e.g greater than 10 msec) then logic circuitry, for example microprocessor 16, associated with the laser detector rejects the pulses as not being emitted from a laser gun. Thus, if the receiver receives a continuous stream of pulses and the stream of pulses fail to have appropriate characteristics then an alarm signal would not be generated.

Thus, in this example a recognition window between 100 Hz to 1 KHz is established by checking a pair of timers. By using a pair of timers to establish the recognition window and by counting pulses, this method increases noise immunity and signal recognition of the laser gun signature.

It should be noted that timers may be set at values other than 1 msec and 10 msec. In some applications it may be desirable to set the first timer to be longer than ten msec. For example thirteen msec may be used. In other applications, however, it may be desirable to set the timer at less than ten msec. For example 7 msec may provide an optimized result.

Similarly the second timer may be provided having a time longer or less than one msec. For example 0.5 msec or 2 msec may be used. Suffice it to say that the particular values of timer constants may be provided such that the receiver is provided having optimum detection characteristics.

After the first and second timers are reset in processing blocks 88, 90 processing continues to processing block 92 where a pulse counter is reset. After the pulse counter is reset, processing continues to the remainder of the program as shown in processing block 114.

If in decision block 86 decision is made that the first timer is running, then processing continues to decision block 96 where it is determined whether the second timer is also running. If the second timer is running then processing continues through processing blocks 88–92 as described above. However, if the second timer is not running, then processing continues to decision block 98 where it is determined whether the received pulse is the second pulse in a stream of pulses.

If the received pulse is the second pulse which has been received then, as shown in processing block 100, the pulse period of the first pulse is computed from the first timer and processing continues to the remainder of the program as shown in processing block 114.

The pulse period is computed by measuring the time between the leading edges of two consecutive pulses. Thus, the pulse period of the first pulse is computed by measuring the elapsed time between detecting the leading edge of the first pulse and the leading edge of the second pulse. Once the first pulse period is established, all future pulse periods are compared to it taking into account a threshold value. This process is repeated until a new first pulse is again received and the processing starts over.

If in decision block 98 decision is made that this is not the second pulse, then processing continues to decision block 104 where it is determined whether the period between received pulses is within a preselected threshold value. If the period is not within the threshold value, then the system concludes that this is not a valid laser pulse signal and processing continues to processing blocks 88–92 as described above.

Thus on the next received pulse and on all subsequent pulses the periods are compared with the period of the first pulse. The subsequent pulse periods need not be identical to the first pulse period, rather, they merely need to be within a predetermined threshold value of the first pulse period. Thus the subsequent pulse periods can differ from the first pulse period by a predetermined amount. This predetermined amount corresponds to the threshold value which may be an empirically derived constant value based on the signature of a laser gun.

If the period is within the threshold value of the first pulses, then processing proceeds to processing block 106 where the pulse counter is incremented. Processing then proceeds to decision block 108 where it is determined whether the number of required pulses has been received. If the number of required pulses has not been received then processing continues to processing block 114 where the remainder of the program is executed.

If the number of required pulses has been received then processing continues to processing block 112 where a laser alarm signal is generated. Processing then continues to the remainder of the program as shown in processing block 114 and the system services user interfaces and waits to receive another pulse.

Since particular laser guns have particular characteristics, or so-called signatures, related to the particular modulation scheme used by the laser source it is possible to determine from which type of laser gun a signal originated. Consequently, to determine the source of the detected laser signal, the periodicity of the received laser pulses are compared with known values. Thus, it is possible to have processing occur and an alarm signal generated only in response to receiving a series of laser pulses having a particular pattern. For example, it may be desirable to generate an alarm signal only after receiving six or eight pulses having substantially common periods. In the present invention a predetermined number of pulses must be received within a predetermined amount of time in order to have processing continue. Thus, in processing steps 104, 106 and 108 the system checks the spacing between a series of pulses and also checks to see if a predetermined number of pulses have been received within a predetermined period of time and are consistent in pulse to pulse periodicity according to a predetermined threshold.

For example, assume an initial pulse is receive at a time $T_0$ which starts the 10 ms and 1 ms timers. At $T_0+1$ msec the 1 msec timer expires. At $T_0+5$ msec another pulse is received. The contents of the 10 msec timer are saved, both timers are reset, and the pulse counter is incremented.

At $T_0+10$ msec a third pulse is received. The contents of the 10 msec timer are compared with the previously stored value from the first two pulses. If the difference is less than the threshold the processing is permitted to continue. This process repeats until N pulses are received, at which time the alarm is sounded.

If it is desired to check for a specific laser source signature then the threshold values and the timer values of the first and second timers may be selected and adjusted accordingly.

The present invention thus provides a method for detecting any number of pulses, while generating an alarm condition after detecting a minimum number of pulses. Here for example, the alarm signal is generated after detecting 6 consecutive pulses.

It should be noted, however, that the alarm signal could be generated in response to fewer or more than 6 pulses. For example, the alarm signal could be generated after receiving only two pulses or after receiving 8 pulses. In this particular application six pulses were empirically determined to provide the laser detector having an optimum response characteristic.

The particular number of pulses to be detected before an alarm signal is generated however should be selected according to a variety of factors including but not limited to how quickly it is desired to generate the alarm signal and the probability of emitting a false alarm signal. Thus, if two pulses generated an alarm signal then the alarm signal would be generated relatively quickly, however, the number of false alarm signals would also be increased. On the other hand if eight pulses were required to generate an alarm signal then the alarm signal would be generated relatively slowly, however, the there would be relatively few if any false alarm signals generated. Therefore process of the present invention sets an alarm condition reliably with the least number of pulses from the detection circuitry.

In the case where a single microcontroller is used to control both the laser and radar detectors, the laser detector, the user interface and the radar detector are each serviced in processing step 114. Microcontroller 49 preferably services each portion of the system each time through the processing loop. Those of ordinary skill in the art will recognize of course that the system may also be interrupt driven.

Figure 5:
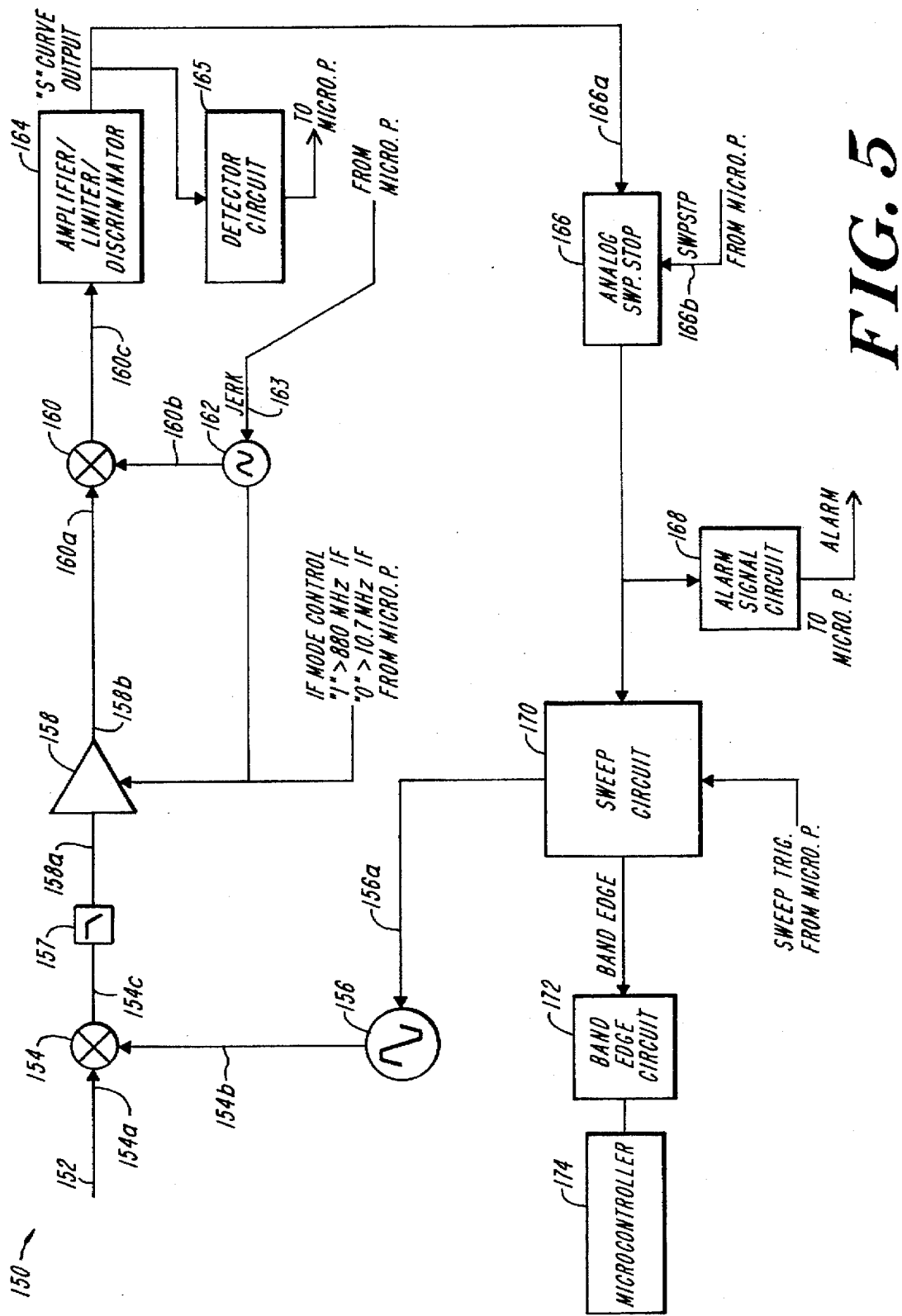
FIG. 5 is a block diagram of a radar detection circuit which may be used in the system of FIG. 1.

Referring now to FIG. 5, a radar detector circuit 150 includes a microwave antenna 152 which here is responsive to signals in the X-band, K-band and Ka-band frequency ranges. Microwave antenna 152 may be provided for example as a horn antenna, a printed circuit antenna or any other antenna which is responsive to signals in a predetermined range of frequencies. Furthermore, antenna 152 may be provided from a plurality of separate antennas each of which, for example, is responsive to signals in a particular one of the X, K and Ka frequency bands. In the case where more than one antenna is used, each of the antennas should feed a signal to mixer 154, or alternatively each antenna may feed one of a plurality of mixers each of which may be similar to mixer 154.

Antenna 152 has an output port coupled to a mixer circuit 154 at an RF input port 154a. A local oscillator (LO) signal source 156 which may be provided as a voltage controlled oscillator (VCO), for example, feeds an LO signal to an LO input port 154b of mixer 154. In response to the RF and LO signals fed thereto, mixer 154 provides a first intermediate frequency (IF) signal at an IF output port 154c. The first IF signal is provided having a frequency which may correspond to the sum or difference of the frequencies of the RF and LO signals and any of their harmonics. Here the first IF signal is provided having a frequency which corresponds to the difference of the frequencies of the RF and LO signals and their harmonics.

The first IF signal is coupled from IF port 154c by means of a filter 157, here having a low pass filter characteristic, to an input port 158a of a first IF amplifier 158. IF amplifier 158 feeds the first IF signal as an input signal to an RF input port 160a of a second mixer 160. Mixer 160 is fed by a second LO signal source 162 at an LO input port 160b. In response to the first IF and LO signals fed thereto, mixer 160 provides a second IF signal at an IF output port 160c. The second IF signal is provided having a frequency which corresponds to the sum or difference of the frequencies of the signals fed to mixer terminals 160a, 160b. Here the second IF signal is provided having a frequency which corresponds to the difference of the frequencies of first IF and second LO signals.

Amplifier 158 and second LO source 162 each receive an IF mode control signal IF_MODE_CONTROL from microprocessor 49. Second LO source 162 also receives a frequency control signal, generally referred to as a JERK signal, from microprocessor 49. The JERK signal and IF_MODE_CONTROL signal will be described further below in conjunction with FIGS. 6–10. In general overview, however, the JERK and IF_MODE_CONTROL signals are used to ensure that radar detection circuit 150 emits an alarm signal only in response signals emitted by a radar speed determination apparatus such as a so-called radar gun, for example, rather than from some other miscellaneous microwave signal source such as another radar detector for example, a so-called police radar detector (PRD).

Mixer 160 feeds the second IF signal to an input port of an FM amplifier/limiter/discriminator circuit 164. Discriminator circuit 164 feeds a discriminator output signal generally referred to as an S-curve to an input port of a vehicle on board radar detector circuit 165. Circuit 165 detects the presence of proximate vehicle on board sensing systems.

Vehicle on board sensing systems generally refer to the so-called collision avoidance systems used in vehicles such as trucks, buses, cars and the like to warn of the possibility of imminent or impending collisions. Many vehicle on board sensing systems emit signals in the K-band frequency range, for example. Generally, the vehicle on board sensing systems emit signals having a particular modulation characteristic to allow the vehicle on board sensing system to measure the distance to a proximate object. For example, the vehicle on board sensing system may be provided as an FM signal having a particular FM deviation and modulated at a frequency of about 60 KHz.

Thus, when conventional radar detectors encounter vehicles equipped with a vehicle on board sensing system, conventional radar detector circuits emit alarm signals which incorrectly identify the vehicle on board sensing system as a radar speed detection system. That is, conventional radar detectors emit a false alarm signal.

In the present invention however, circuit 165 is tuned to receive signals having a modulation characteristic which corresponds to the modulation characteristic of a vehicle on board sensing system. When such a signal is detected the circuit 165 provides a signal which prevents any false alarm signals from being provided. In the present system, this is accomplished by circuit 165 providing a signal at an output port thereof to microprocessor 49. Upon receipt of such a signal, the microprocessor forbids any K-band alarm signals for the duration of the vehicle on board sensing modulation. In one embodiment circuit 165 may include a tone decoder provided as a phase locked loop (PLL) circuit. The tone decoder circuit is provided having a time constant such that the tone decoder demodulates the modulated vehicle on board sensing signal and thus detects the modulation signal (e.g. the 60 KHz modulation signal). When the modulated signal is detected, circuit 165 provides a signal at an output port thereof. Microprocessor 49 polls circuit 165 and when microprocessor 49 detects the output signal provided from circuit 165, microprocessor 49 ignores the signal alarm line for K-band signals. It should be noted however, that valid X and Ka band signals should still cause an alarm signal to be generated. Microprocessor inhibits any K-band alarms as long as circuit 165 continues to provide the output signal. Thus circuit 165 minimizes the number of alarm signals generated in response to the presence of an operating vehicle on board sensing system. That is, the radar detector of the present invention provides a minimal number of false alarm signals generated in response to the presence of operating vehicle on board sensing systems. It should be noted that circuit 165 may be appropriately "tuned" to respond to any signal having a known modulation scheme. Thus circuit 165 may be used to detect the presence of signals emitted from other types of circuits in addition to vehicle on board sensing systems.

Discriminator 164 also feeds an S-curve signal to a first input port 166a of an analog sweep stop circuit 166. Analog sweep stop circuit 166 also receives, at a second input port 166b, a SWPSTOP signal from the microprocessor. Sweep stop circuit 166 feeds a signal to an alarm circuit 168 which may include a comparator circuit for example.

Sweep stop circuit 166 also feeds a signal to sweep circuit 170. Sweep circuit 170 additionally provides a sweep signal to the microprocessor through a band-edge detector circuit 172. Sweep circuit 170 may be provided for example as the type described in U.S. Pat. No. 4,315,261 issued Feb. 9, 1992 and assigned to the assignee of the present invention and incorporated herein by reference. Sweep circuit 170 is coupled to LO source 156 at a sweep control port 156a.

The radar detector of the present invention operates in accordance with a predetermined frequency plan. In this frequency plan, the choice of LO and IF frequencies minimizes the amount of interference provided from signals having frequencies which correspond to fundamental and second harmonic frequencies generated by local oscillator signal sources of other radar detector systems. Furthermore, the frequency plan results in a radar detector having a VCO which provides fundamental frequency signals over a relatively narrow frequency range while still allowing the radar detector to detect signals over a super wide band frequency range.

That is, the radar detector of the present invention operates in three separate frequency bands, here the X, K and Ka frequency bands. The VCO, however, only provides to mixer 154 LO signals having a fundamental frequency between 11.238 GHz and 11.895 GHz. Thus signals in the frequency range of 10.500 GHz to 10.550 GHz may be detected by signals in the fundamental frequency band of the VCO 156.

VCO 156 also provides to mixer 154 so-called harmonics of the fundamental frequency VCO signals. By providing signals at the second harmonic frequencies to mixer 154, mixer 154 can receive signals in K-band frequency range from antenna 152 and provide IF signals in the first IF frequency range at IF port 154c. Thus, the second harmonic signals provided by VCO 156 and/or mixer 154, allows detection of signals having frequencies in the K-band frequency range and in particular in the frequency range between 24.005 GHz and 24.250 GHz.

Likewise, the third harmonic signals provided by VCO 156 and/or mixer 154, allow detection of signals in the Ka-band frequency range received by antenna 152. In particular, the system can detect signals in the frequency range between 33.4–36.0 GHz.

When the LO signal sweeps by an RF signal emitted by a radar gun in the X, K or Ka frequency bands, mixer 154 generates a pair of IF signals having frequencies corresponding to 900 and 920 MHz.

VCO 156 provides an LO signal which sweeps in frequency from 11.895 GHz to 11.238 Ghz in 375 milliseconds (msec). A guard band may also be included to account for temperature drift and stability and to ensure that the system is always able to cover the entire desired frequency range. If radar circuit 150 receives a signal, microprocessor 49 performs processing on the signal to determine if the received signal is in the X-band frequency range. If the signal is identified as a valid X-band signal and there are no other received signals then the processor emits an ALARM signal.

The band identification and alarm signals are generated in the following manner. VCO 156 sweeps through the full frequency range. All responses received as a result of the full sweep are processed in microprocessor 49 to determine the frequency band of the received signal and to determine if a corresponding alarm signal should be generated. The order in which the X, K and $K_a$ band signals are alarmed are prioritized such that $K_a$-band alarm signals receive first priority, K-band alarms receive second priority and X-band alarms receive third priority.

The processor first determines if the received signal could be a valid Ka-band signal. If the processor does not indicate that the signal may be a Ka-band signal, then K-band or X-band signal criteria is checked, depending upon the location of the detected signal in the sweep. If it is determined that multiple-band signals exist, the alarm signal which is set is based on a predetermined priority. Thus, the X-band alarm is typically set when only an X-band signal is detected.

If the received signal could be a valid Ka-band signal then a PRD sweep is performed to ensure the received Ka-band signal is not the third harmonic of another radar detector. In the PRD sweep, the processor verifies that the received signal is a valid Ka-band signal by triggering VCO 156 to initiate a second LO signal sweep referred to as the band select sweep. In the band select sweep the system determines if the received signal is a third harmonic of another radar detector or if the received signal is a valid Ka-band radar signal from a speed detection device such as a so-called radar gun.

If no PRD signal is detected then the Ka-band alarm signal is generated. Thus, in all cases the responses are recorded, analyzed and an alarm signal is generated for one band only.

Figure 6:
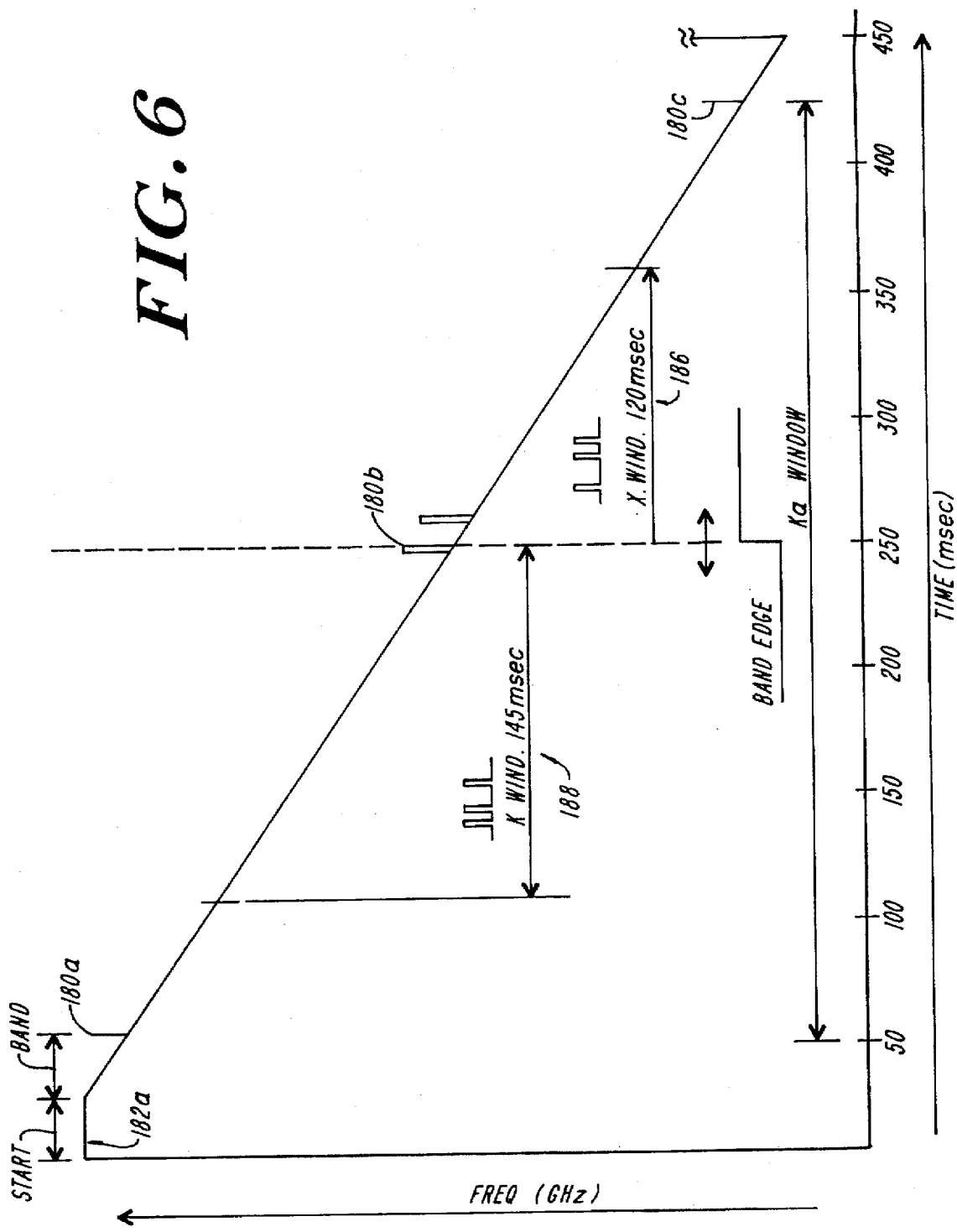

A signal BAND_EDGE is provided as the output of a band-edge circuit 172. The BAND_EDGE signal is used to determine the time positions of the X-band and K-band signals. The BAND-EDGE signal is held high at 229 msec in the sweep which corresponds to the end of the K-band time interval as shown in FIG. 6. If a signal is received during the K-band time interval which has some characteristics which correspond to the K-band signals but other characteristics which do not and the BAND_EDGE signal is high, the probability is that the received signal is a Ka-band signal and the system is alarmed accordingly. Thus, the BAND_EDGE signal is used to help distinguish between signals in the K and Ka frequency bands.

Referring now to FIG. 6, a plot of frequency versus microprocessor timing normalized to the period of a single VCO sweep is shown. It is desirable for the microprocessor to differentiate between received signal frequencies in the X, K and Ka frequency bands and to provide such information to a user through display 18. Since the microprocessor cannot directly differentiate between received signal frequencies another scheme must be devised such that the microprocessor can distinguish received signals in the X, K and Ka frequency bands.

This may be accomplished by having the microprocessor measure time periods as will be described in conjunction with FIG. 6A. Alternatively the microprocessor may distinguish between received signal frequencies based on measured VCO tuning voltage as will be described below.

VCO 156 (FIG. 5) may be provided as digitally controlled oscillator or a varactor-tuned oscillator. In the case where a varactor tuned oscillator is used, VCO 156 uses the voltage controlled capacitance of a varactor diode to accomplish the electronic tuning. Thus, a start voltage applied to VCO 156 tunes VCO 156 such that VCO 156 provides a signal having an initial or start frequency. Likewise, a stop voltage applied to VCO 156 tunes VCO 156 such that VCO 156 provides a signal having an ending or stop frequency.

As described above in conjunction with FIG. 5, in this particular embodiment the VCO start and stop frequencies correspond to frequencies of 11.895 GHz and 11.238 GHz. Ideally, a linear voltage applied to VCO 156 results in VCO 156 providing a corresponding linear change in VCO signal frequency. Practically, however, varactor diodes typically have a nonlinear response to such a VCO tuning voltage. Thus, although the VCO tuning voltage may be linear, typically VCO 156 does not provide a correspondingly linear change in frequency.

Furthermore, each varactor diode typically has slightly different tuning capacitance characteristics. That is, each varactor is not identically tuned between a start and a stop frequency. Thus, because of the aforementioned problems with varactor diodes, VCO tuning characteristics typically vary between a plurality of VCOs.

Due to such nonlinear tuning characteristics, a particular voltage applied to the VCO provides a signal having a frequency which may be different than the frequency expected from application of that particular VCO tuning voltage to an ideal VCO. Consequently the VCO is said to have a nonlinear frequency response. Moreover the curvature of the slope between the start and stop frequencies is unknown. It is thus necessary to devise a scheme to linearize the VCO frequency response.

Because the curvature of slope between the start and stop VCO signal frequencies is unknown, it is relatively difficult to determine the precise frequency at a particular point in time during the VCO sweep. Thus a plurality of calibration signals 180a, 180b and 180c are injected into the sweep at the start, middle and end points of the VCO frequency sweep.

The largest deviation from an expected signal frequency tends to occur toward the center of the VCO sweep. Thus in the present invention, calibration signal 180b having a frequency of 10.610 Ghz is injected into the sweep to act as calibration point to effectively linearize the VCO tuning frequency.

The BAND_EDGE signal is adjusted in response to the externally injected calibration signal 180b. The BAND_EDGE signal provided from the band-edge comparator will be described in conjunction with FIG. 13. Since the VCO tuning voltage is provided having a relatively linear characteristic between the start voltage and stop voltage, by injecting the calibration signal which typically falls at the midway point of the VCO tuning voltage an accurate calibration indicator is provided. Thus, the need for a VCO linearization board is eliminated.

Furthermore, the present technique results in a sliding calibration scheme. That is, the occurrence of the calibration signal in time is based on VCO tuning voltage linearity rather than time. The microprocessor thus "slides" a window either forward or back in time within the VCO sweep period such that the calibration signal is injected at the midway point of the VCO tuning voltage.

A sweep start period occurs within an initial 25 msec time band. This time period could be reduced to 10 msec for example to minimize the amount of time required for the overall VCO sweep period here shown to be 450 msec. A second 25 msec window corresponds to a guard band. A second guard band is also provided prior to reaching the ending frequency. Thus the operating frequency range of the radar system (i.e. 11.895 GHz to 11.238 GHz) is covered in 375 msec which corresponds to a tuning rate of 1.85 MHz/msec (657 MHz/375 msec).

This tuning rate was selected such that the detector output signal generally referred to as S-curves do not become asymmetric. Furthermore, since processing depends upon the ability to detect a pair of first IF signals having frequencies of respectively 899 MHz and 921 MHz, both of these signals and the ability to look at the time spacing between the pair of signals is required. It is thus important not to sweep too rapidly since this could result in one of the pair of signals having a weak or even nondetectable amplitude level and then the processor will not recognize the received input signal as a valid signal. A tuning rate of 1.85 MHz/msec prevents such problems.

As shown in FIG. 6, signals in the Ka-band frequency range may be detected during any time within the entire 375 msec VCO sweep over the operating frequency of the system. Two segmented portions of the time interval 186, 188 correspond to those times during the sweep in which signals in the X-band and K-band frequencies may be detected.

The criteria for screening valid received signals from invalid received signals is based on a plurality of factors. One factor is the time period in the sweep during which the signal occurred. For example if the signal was received in the range of the K-band window 188, this may indicate a signal in the K-band frequency range was received. Second, the time spacing between the pair of signals is compared with a predetermined value. Third, the system determines if an appropriate response to the JERK signal exists. This three level screening is used to validate signals received in the K-band or X-band frequency ranges. Since Ka-band signals may occur at any time during the 50 msec-425 msec range of the VCO sweep period, the time in the sweep period during which the signal is received has no meaning for Ka-band signals. The technique for classifying Ka-band signals will be described below in conjunction with FIG. 10.

Referring now to FIG. 6A, a plot of frequency versus microprocessor timing normalized to the period of a single VCO sweep is shown. In this alternate embodiment, the microprocessor tracks time intervals to differentiate between signal frequencies. A sweep start period occurs within an initial 25 msec time band. This time period could be reduced to 10 msec for example to minimize the amount of time required for the overall VCO sweep period here shown to be 450 msec. A second 25 msec window corresponds to a guard band. A second guard band is also provided prior to reaching the ending frequency. Thus, the operating frequency range of the radar system (i.e. 11.895 GHz to 11.238 GHz) is covered in 375 msec which corresponds to the tuning rate of 1.85 MHz/msec (657 MHz/375 msec) described above.

The system compensates for VCO frequency drift by providing the 25 msec guard band at both the beginning and end of the VCO sweep. This prevents any uncovered frequency regions generally referred to as "holes" from developing in the middle of the VCO frequency band.

As in the scheme describe above in conjunction with FIG. 6, the band identification scheme still depends upon the ability to detect a pair of first IF signals having frequencies of about 899 MHz and 921 MHz. Thus, both of these signals and the ability to look at the time spacing between the pair of signals is required.

As shown in FIG. 6A, signals in the Ka-band frequency range may be detected during any time within the 50 msec to 425 msec sweep period of VCO 156. Two segmented portions of the time interval correspond to those times during the sweep in which signals in the X-band and K-band frequencies may be detected.

The criteria for screening valid received signals from invalid received signals is based on a plurality of factors. First, the particular time in the sweep during which the received signal was detected is used. For example, if the signal was received in the range of 167 msec after sweep start this may indicate a signal in the K-band frequency range was received. Second, the time spacing between the pair of signals is compared with a predetermined value. Third, the system determines if an appropriate response to the JERK signal exists. This three level screening is used to validate K-band or X-band frequencies. As mentioned above in conjunction with FIG. 6, the technique for classifying Ka-band signals will be described below in conjunction with FIG. 10.

Figure 7:
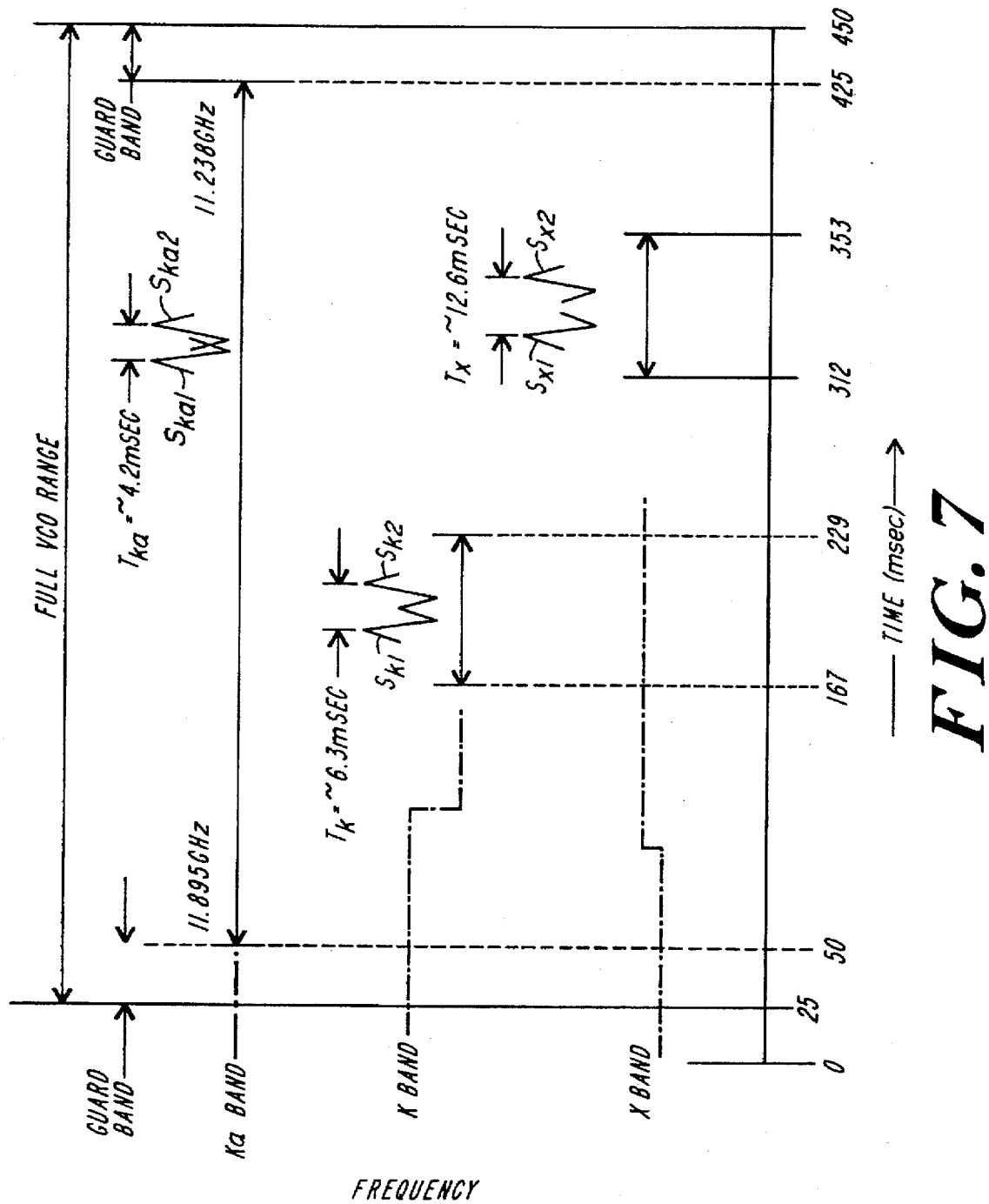
FIG. 7 is a plot of frequency vs. time illustrating the relative time separations between a pair of detected signals in the X, K and Ka frequency bands.

Referring now to FIG. 7, a plot of frequency vs. time illustrating the relative time separations between pairs of detected signals $S_{x1}$, $S_{x2}$; $S_{k1}$, $S_{k2}$ and $S_{ka1}$, $S_{ka2}$ in the X, K and Ka frequency bands is shown. The spacing patterns Tx, Tk, Tka of the respective pairs of S-curve signals generated as a result of receiving two first IF signals having respective frequencies of 899 MHz and 921 MHz may be measured and compared to a predetermined value to see which one, if any, of the predetermined frequency ranges the pair of signals correspond to. That is, the pair of signals $S_1$, $S_2$, are spaced by a time $T_x$ then the received signal was in a first predetermined frequency band here corresponding to the X-band.

If the signals $S_1$, $S_2$ are spaced by a time $T_K$ then the received signal was in a second predetermined frequency band here corresponding to the K-band frequency range. Likewise, if the pair of signals $S_1$, $S_2$ are spaced by a time $T_{Ka}$ then the received signal was in a third predetermined frequency band here corresponding to the Ka-band frequency range.

The actual IF frequencies are determined by fixed tuned resonant circuits coupled to discriminator 164 (FIG. 5). The IF frequency Therefore will vary slightly from unit to unit and also in accordance with tolerance values available in the associated circuit components. Thus the actual second IF frequency is approximately 11 MHz and therefore the pair of first IF signals are provided having frequencies typically of about 899 and 921 MHz respectively. For simplicity, however, the frequencies will here by assumed to be 900 MHz and 920 MHz.

Thus, In this particular example, if signals $S_1$ $S_2$ are spaced by a time corresponding to 12.6 msec then the pair of signals was generated in response to a received signal having a frequency in the X-band frequency range. That is, the signal corresponds to detection of a signal at the fundamental frequency of the radar detection circuit.

If, however the signals $S_1$, $S_2$ are spaced by a time corresponding to 6.34 msec then the pair of signals $S_1$, $S_2$ were generated in response to a received signal having a frequency in the K-band frequency range.

Similarly, if the signals $S_1$, $S_2$ are spaced by a time corresponding to 4.2 msec then the pair of signals $S_1$, $S_2$ were generated in response to a received signal having a frequency in the Ka-band frequency range.

It is possible of course due to noise and extraneous signals for any of the pairs of signals i.e. the so-called signatures, to be generated at any point in the sweep. Thus to distinguish between valid and invalid signals, the signature must also have a corresponding valid JERK response signal.

The JERK response signal will be described in detail below in conjunction with FIGS. 7–10. Suffice it here to say that a valid signal must fall somewhere near or within a predetermined time region of the full sweep period and the signal must have the corresponding valid JERK and un-JERK response signals.

Figure 8:
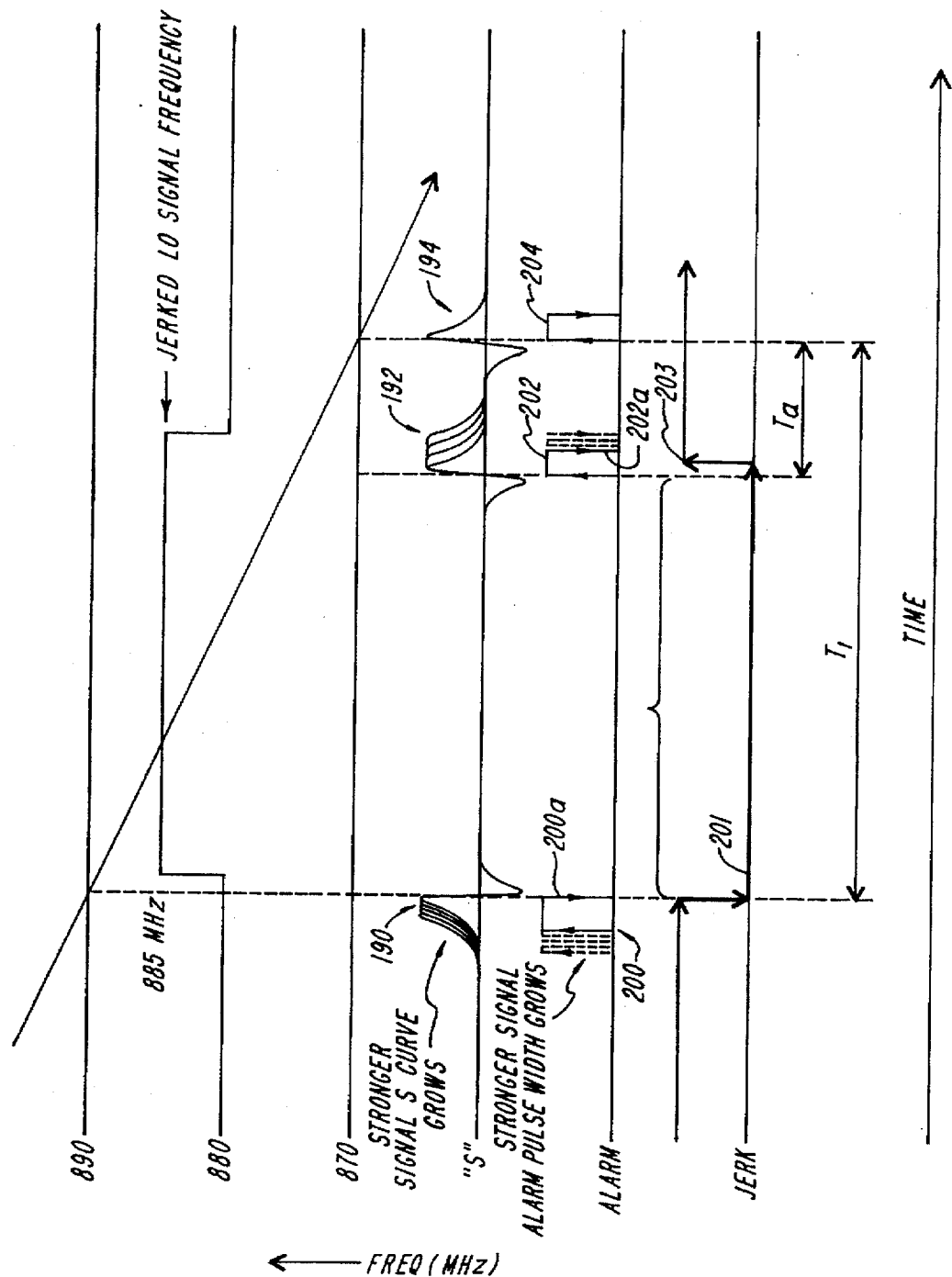
FIG. 8 is a plot of frequency vs. time illustrating the relative timing of a JERK signal and a pair of detected signals for a received signal having a frequency in the X-band frequency range.

Referring now to FIG. 8, a plot is shown which illustrates the timing of the signal processing of the JERK and un-JERK signals which occurs if the received signal is an X-band signal.

When receiving signals in the X-band frequency range the signals of interest have a frequency typically of about 10 GHz. VCO signal source 156, however, provides an LO signal having a frequency typically of about 11 GHz. Thus the frequency of the LO signal fed to mixer 154 is higher than the frequency of the RF signal a condition generally referred to as a high side LO.

As shown in FIG. 6, the LO signal source sweeps from a high frequency to a low frequency. Thus the first IF signal provided from mixer 154 decreases with frequency as a function of time.

The first IF signal is fed to mixer 160 (FIG. 5) along with the second LO signal initially provided having a frequency of 910 MHz. Mixer 160 provides a second IF having signal at a first frequency typically of about 10 MHz. The second LO signal source 162 has a variable reactance under control of the microprocessor via the jerk control line 163 (FIG. 5). The microprocessor provides the JERK signal to the LO source 162 such that the reactance of source 162 is changed to consequently cause a discrete change in frequency to the signal provided by source 162.

The first time the first received IF signal is within typically of about 10 MHz of the second LO frequency 910 MHz a first S-curve signal 190 is generated and a corresponding alarm signal 200 is generated. Thus, when the IF signal frequency equals 920 MHz a first alarm signal 200 is generated.

The discriminator S-curve has a relatively rapid transition between the positive and negative regions of the curve. However as a function of signal strength, as the frequency of the second IF signal approaches the pole of discriminator 164 then a response is generated.

Consequently as indicated in FIG. 8 the stronger the received signal the earlier in time the S-curve is generated. Thus for stronger signals an alarm signal may actually be generated earlier and earlier in time. However, the stronger the received signal, the more mistuning which exists.

On the other hand, if the received signal has a relatively small amplitude then the signal is generally not detectable until the signal is precisely at 910 MHz. Thus, several S-curves 190 are shown in FIG. 8 to represent the various times at which the S-curve signal is generated depending on the above-mentioned factors.

Consequently the leading edge of the alarm signal may also have a variation in time corresponding to the generation of the S-curves. However the transition from the positive peak of the discriminator S-curve signal to the negative peak of the S-curve signal is relatively rapid, thus the transition point remains relatively constant regardless of the received signal strength.

On the falling edge 200a of alarm signal 200 the microprocessor emits a signal 201 having a low logic level on the jerk control line 163 (FIG. 5). This causes LO source 162 to switch frequencies within a predetermined period of time. The JERK signal causes the second LO source 162 to provide an LO signal having a frequency which is higher, in this example, by 5 MHz, than the frequency of the LO signal initially provided by source 162.

This frequency switch may be accomplished by making a transistor collector-base capacitance of source 162 emulate the capacitance of a varactor diode. Thus the collector-base capacitance is changed as a function of bias signal. This change in capacitance changes the frequency of the signal provided from LO source 162.

By switching the frequency of the LO source 162 a JERK response signal 192 is generated. A second alarm signal 202 is generated in response to the JERK response signal 192. When the processor detects the rising edge 202a of the second alarm signal 202, the processor emits a signal 203 having a high logic level on the jerk control line 163. This causes LO source 162 to return to its initial frequency of about 910 MHz and a third S-curve signal response 194 is thus generated. The third signal 194 is the signal which would be generated regardless of use of the JERK signal. The third response 194 is generated after the JERK signal is removed and thus is referred to as an un-JERKED response signal.

Thus whenever a valid signal is present, three alarm signals 200, 202, 204 are generated. The first and third signals 200, 204 are spaced by a time $T_1$ which is dependant upon the IF frequency and the sweep rate. For a received signal in the X-band frequency range the spacing $T_1$ corresponds to a time of about 12.6 msec. Thus the two outside signals 200, 204 occur as if no JERK signal had been used. The JERK response 202, on the other hand is always within the time window between the first and third signals 202, 204.

Since the frequency of the IF signal is known to change at a particular rate and the frequency change which occurs in response to the JERK signal is known to correspond to 5 MHz, then the second and third alarm signal should be spaced by a time $T_Z$ typically corresponding to about 3 msec. Thus to verify that an X-band signal is received, the location of the signal within the sweep was known, the JERK signal resulted in an additional signal being provided, and each of the signals were provided having predetermined response and spacing characteristics. Before generating an alarm signal, the processor essentially examines three timing relationships. First, the processor determines where in the sweep the signal first occurred. Second the processor examines the JERK response signal and third, the processor examines the un-JERKED response signal. Thus if each of these elements are satisfied, the system may conclude that an X-band signal has been received and thus an X-band alarm signal is generated so indicating this.

Figure 9:
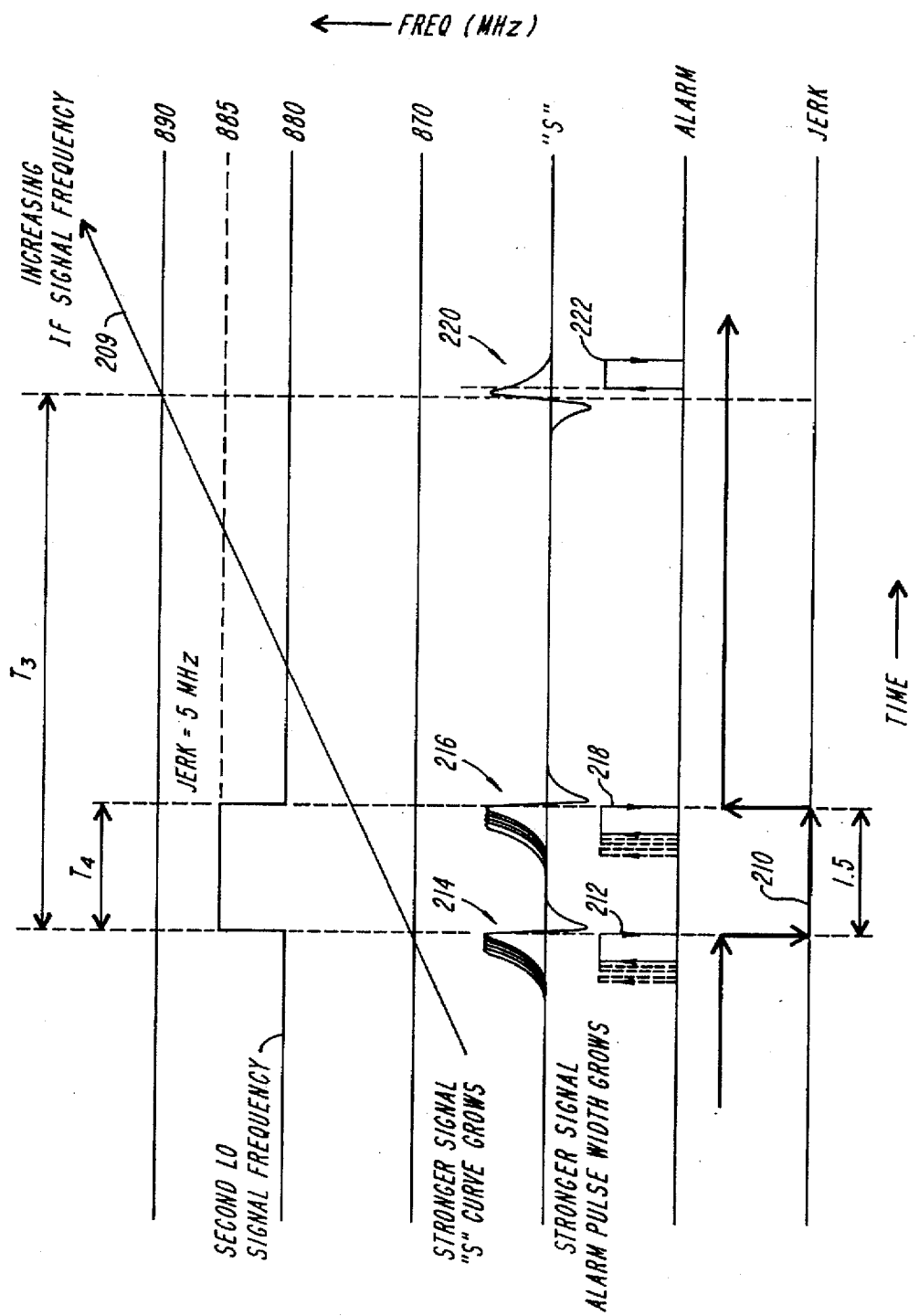
FIG. 9 is a plot of frequency vs. time illustrating the timing of the JERK signal and a pair of detected signals for a received signal having a frequency in the K-band frequency range.

Referring now to FIG. 9, the frequency and timing relationships between signals generated in response to a received signal having a frequency in the K-band frequency range is shown. The K-band frequency of interest is typically in the range of about 24 GHz. Two times the VCO fundamental frequency is typically in the range of about 23 GHz. Thus, the mixer 154 now operates as a difference mixer with the LO signal frequency being lower than the frequency of the received signal.

VCO source 156 still sweeps from a high starting frequency to a low ending frequency in a 375 msec time period. Thus a valid K-band signal produces an IF signal having a frequency which increases with respect to time as indicated by curve 209.

As in the X-band case, microprocessor 49 generates a JERK signal 210 at the falling edge of the first alarm signal 212 generated in response to an S-curve signal 214. However, since the IF signal is increasing in frequency, when the second LO source 162 is provides a signal having a higher frequency in response to the JERK signal, a second S-curve signal 216 is generated shortly after the first S-curve signal 214. The JERK signal 210 is then disabled at the edge of a second alarm signal 218 and the VCO frequency sweep continues to provide a third S-curve signal 220 and a corresponding alarm signal 222. Again it should be noted that the third S-curve signal 220 would have occurred regardless of use of the JERK signal. The first and third S-curve 214, 220 and alarm signals 212, 222 thus correspond to the pair of signals needed to generate a valid alarm signal.

The first and third signals 214, 220 and 212, 222 are here spaced by a Time $T_3$ related to the frequency of the second harmonic LO signal and the sweep rate. Thus, the spacing between the first and third S-curve signals is about one-half the time spacing in the X-band case which corresponds to about 6.3 msec.

The total change in received signal frequency between the first and third alarm signals 212, 222 is about 20 MHz. However, a zero beat signal occurs one-half way between the first and third alarm signals. The frequency change provided by the JERK signal is selected to correspond to about one-fourth the frequency distance between a first signal and zero beat. Thus the frequency change introduce by the JERK signal is selected to be about 5 MHz.

Other frequency changes besides 5 MHz could also be used. For example, the change in frequency provided by application of the JERK signal could be provided as 2.5 MHz or 7.5 MHz. It should be noted, however, that if the frequency change caused by the application of the JERK signal is selected to be smaller than 5 MHz, then microprocessor 49 must be capable of measuring relatively small increments of time. Similarly, if the frequency change caused by the application of the JERK signal is selected to be larger than 5 MHz, then when making comparisons between signals in the K and Ka-band frequency ranges, the VCO nonlinearity could appear to become even more pronounced.

Processing for identification of X and K-band signals may be accomplished on the same sweep. Processing to identify signals in the Ka-band frequency range may require an additional sweep as will be explained in conjunction with FIG. 10.

Figure 10:
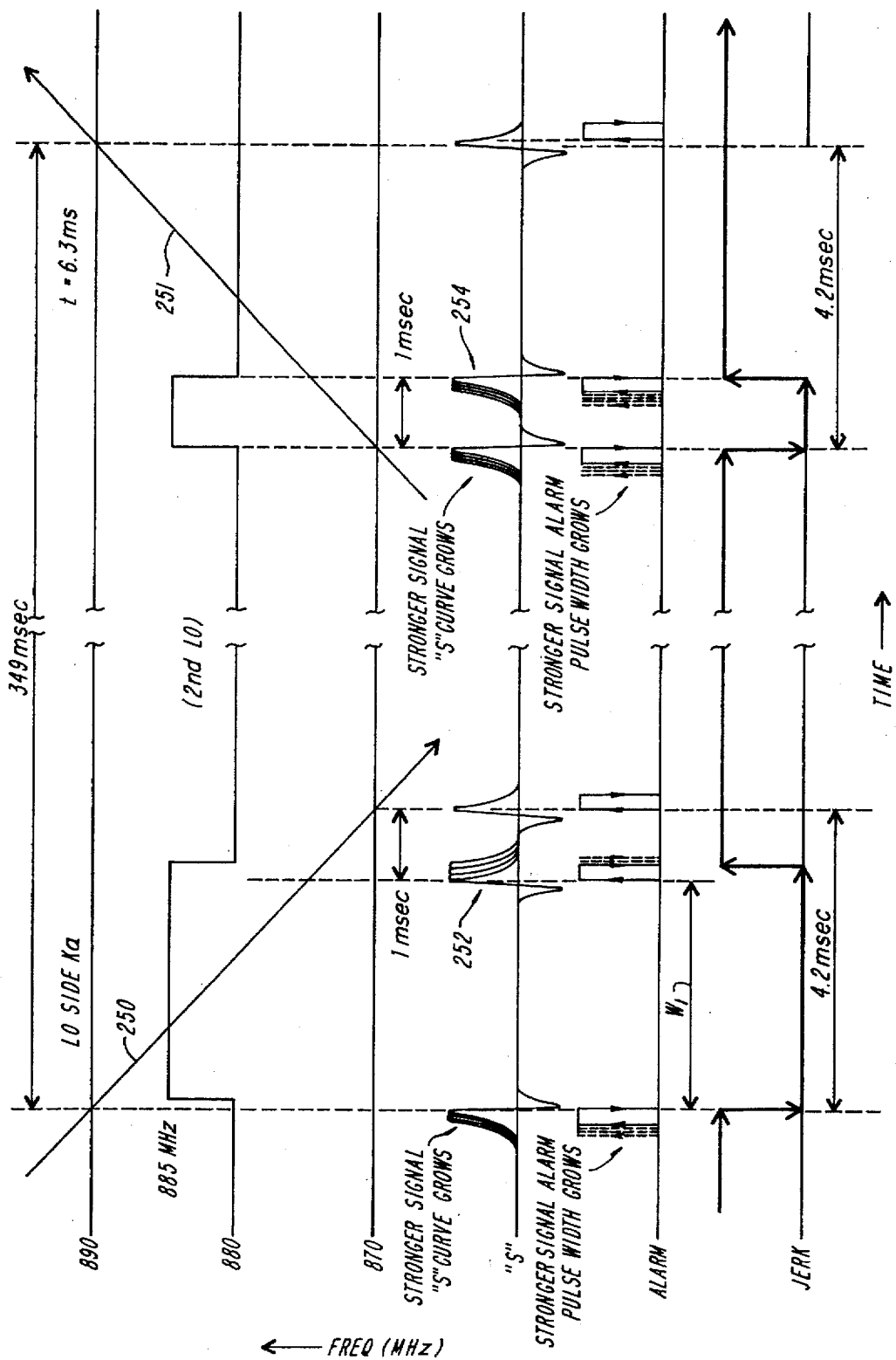
FIG. 10 is a plot of frequency vs. time illustrating the timing of the JERK signal and a pair of detected signals for a received signal having a frequency in the Ka-band frequency range.

Referring now to FIG. 10, the frequency and timing relationship between signals generated in response to a received signal in the Ka-band frequency range is shown. In the embodiment described herein, the total operational Ka-band frequency range is typically of about 33.4 GHz to 36 GHz.

In the Ka-band frequency range, the LO signal provided by VCO 156 may have a frequency either below or above the frequency of the RF signal received by antenna 152. Consequently, depending on whether the LO signal frequency is above or below the received RF signal frequency, the first IF signal may be provided having either a decreasing frequency or an increasing frequency with respect to time as indicated by curves 250, 251. Thus, one JERK signal response 252 may be provided for an IF signal having an increasing frequency and a second different JERK signal response 254 may be provided for an IF signal having a decreasing frequency.

In the Table is shown an example of an operating frequency range which may be used in a radar detector similar to the radar detector circuit 14 (FIG. 1). In the Table, the VCO provides an LO signal which sweeps in frequency from 11.885 GHz to 11.259 GHz in 370 msecs. It should be noted that microcontroller 49 may be programmed such that particular frequency ranges within the overall frequency range may be excluded from the operational bandwidth of the device. Thus, it is possible to provide a radar detector having different operational frequency regions while still providing detector coverage over the total frequency range.

TABLE

| Time (msec) | LO FREQ (MH$_z$) | 3d Harmonic (MH$_z$) | LO below RF (MH$_z$) | LO above RF (MH$_z$) |
| --- | --- | --- | --- | --- |
| 0 | 11885.0 | 35655.0 | 36535.0 | 34775.0 |
| 10 | 11868.1 | 35604.3 | 36484.3 | 34724.3 |
| 20 | 11851.2 | 35553.6 | 36433.6 | 34673.6 |
| 30 | 11834.3 | 35502.9 | 36382.9 | 34622.9 |
| 40 | 33817.4 | 35452.2 | 36332.2 | 34572.2 |
| 50 | 11800.5 | 35401.5 | 36281.5 | 34521.5 |
| 60 | 11783.6 | 35350.8 | 36230.8 | 34470.8 |
| 70 | 11766.7 | 35300.1 | 36180.1 | 34420.1 |
| 80 | 11749.8 | 35249.4 | 36129.4 | 34369.4 |
| 90 | 11732.9 | 35198.7 | 36078.7 | 34318.7 |
| 100 | 11716.0 | 35148.0 | 36028.0 | 34268.0 |
| 110 | 11699.1 | 35097.3 | 35977.3 | 34217.3 |
| 120 | 11682.2 | 35046.6 | 35926.6 | 34166.6 |
| 130 | 11665.3 | 34995.9 | 35875.9 | 34115.9 |
| 140 | 11648.4 | 34945.2 | 35825.2 | 34065.2 |
| 150 | 11631.5 | 34894.5 | 35774.5 | 34014.5 |
| 160 | 11614.6 | 34843.8 | 35723.8 | 33963.8 |
| 170 | 11597.7 | 34973.1 | 35673.1 | 33913.1 |
| 180 | 11580.8 | 34742.4 | 35622.4 | 33862.4 |
| 190 | 11563.9 | 34691.7 | 35571.7 | 33811.7 |
| 200 | 11547.0 | 34641.0 | 35521.0 | 33761.0 |
| 210 | 11530.1 | 34590.3 | 35470.3 | 33710.3 |
| 220 | 11513.2 | 34539.6 | 35419.6 | 33659.6 |
| 230 | 11496.3 | 34488.9 | 35368.9 | 33608.9 |
| 240 | 11479.4 | 34438.2 | 35318.2 | 33558.2 |
| 250 | 11462.5 | 34387.5 | 35267.5 | 33507.5 |
| 260 | 11445.6 | 34336.8 | 35216.8 | 33456.8 |
| 270 | 11428.7 | 34286.1 | 35166.1 | 33406.1 |
| 280 | 11411.8 | 34235.4 | 35115.4 | 33355.4 |
| 290 | 11394.9 | 34184.7 | 35064.7 | 33304.7 |
| 300 | 11378.0 | 34134.0 | 35014.0 | 33154.0 |
| 310 | 11361.1 | 34083.3 | 34963.3 | 33203.3 |
| 320 | 11344.2 | 34032.6 | 34912.6 | 33152.6 |
| 330 | 11327.3 | 33981.9 | 34861.9 | 33101.9 |
| 340 | 11310.4 | 33931.2 | 34811.2 | 33051.2 |
| 350 | 11293.5 | 33880.5 | 34760.5 | 33000.5 |
| 360 | 11276.6 | 33829.8 | 34709.8 | 32949.8 |
| 370 | 11259.7 | 33779.1 | 34659.1 | 32899.1 |

The first column of the Table shows the dynamic system time in msec. The second column shows the fundamental frequency of the LO source 156 at the corresponding dynamic times. Thus, an LO signal having a frequency of 11.885 GHz is here shown at 0 msec while in FIG. 6 the same signal would be shown to occur at the 50 msec time period. The third column shows the frequencies of the third harmonic of the LO signal.

The fourth and fifth columns show the frequencies corresponding to the low side LO and high side LO cases. That is, the IF signal may be a result of a low side LO (Column 4) or of a high side LO (Column 5). Thus, during the time period between 0 msec and 280 msec the IF signal may have a decreasing frequency.

Similarly during the time period between 80 msec and 375 msec the IF signal may have an increasing frequency. Finally during the time period between 80 msec and 280 msec the IF signal may be the result of either a low side LO or a high side LO and thus in this region the IF signal may have a frequency which either decreases or increases with time.

Figure 11:
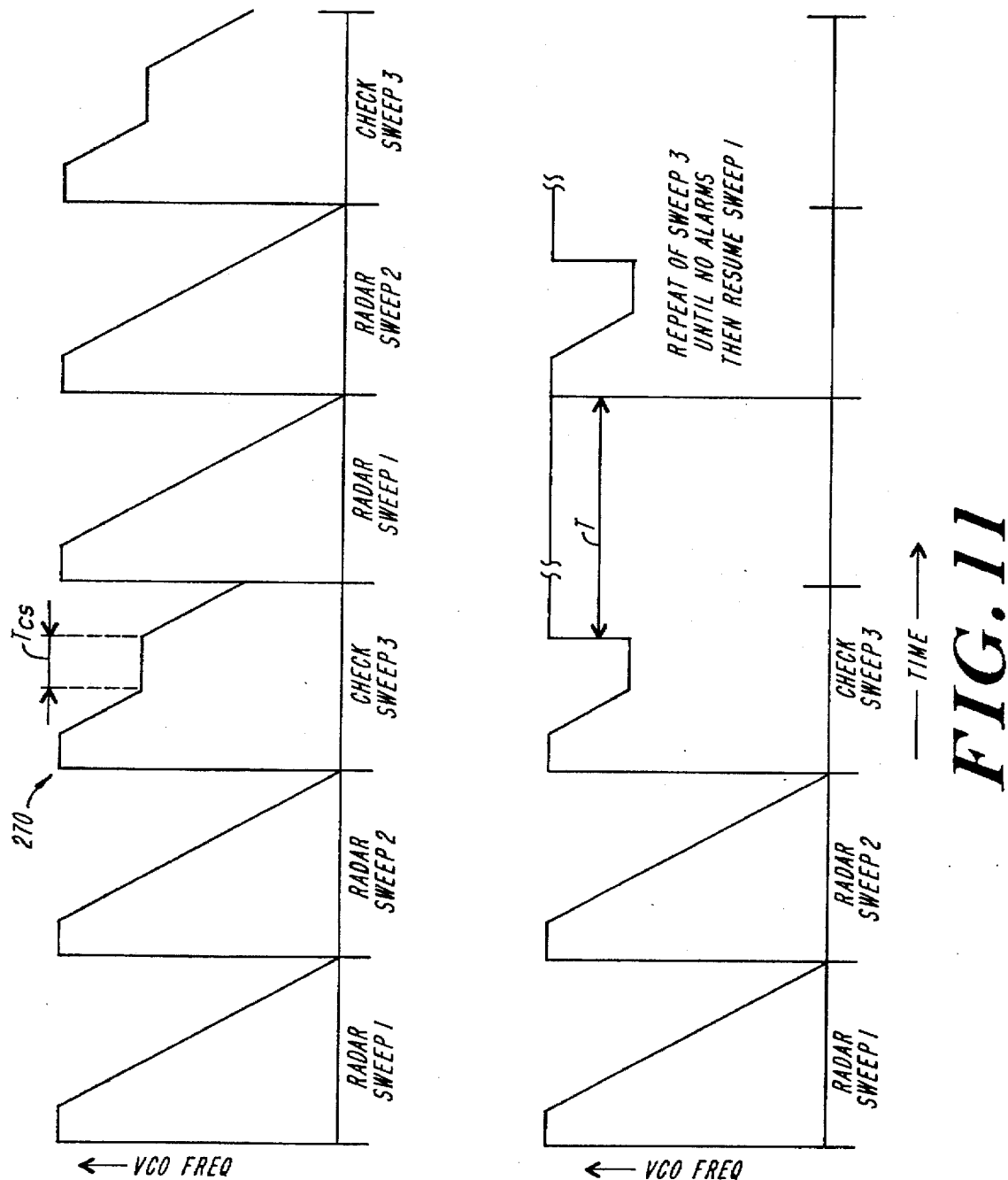
FIG. 11 is a plot illustrating the sweep periods of a radar detector having a receiver detection mode.
Figure 12:
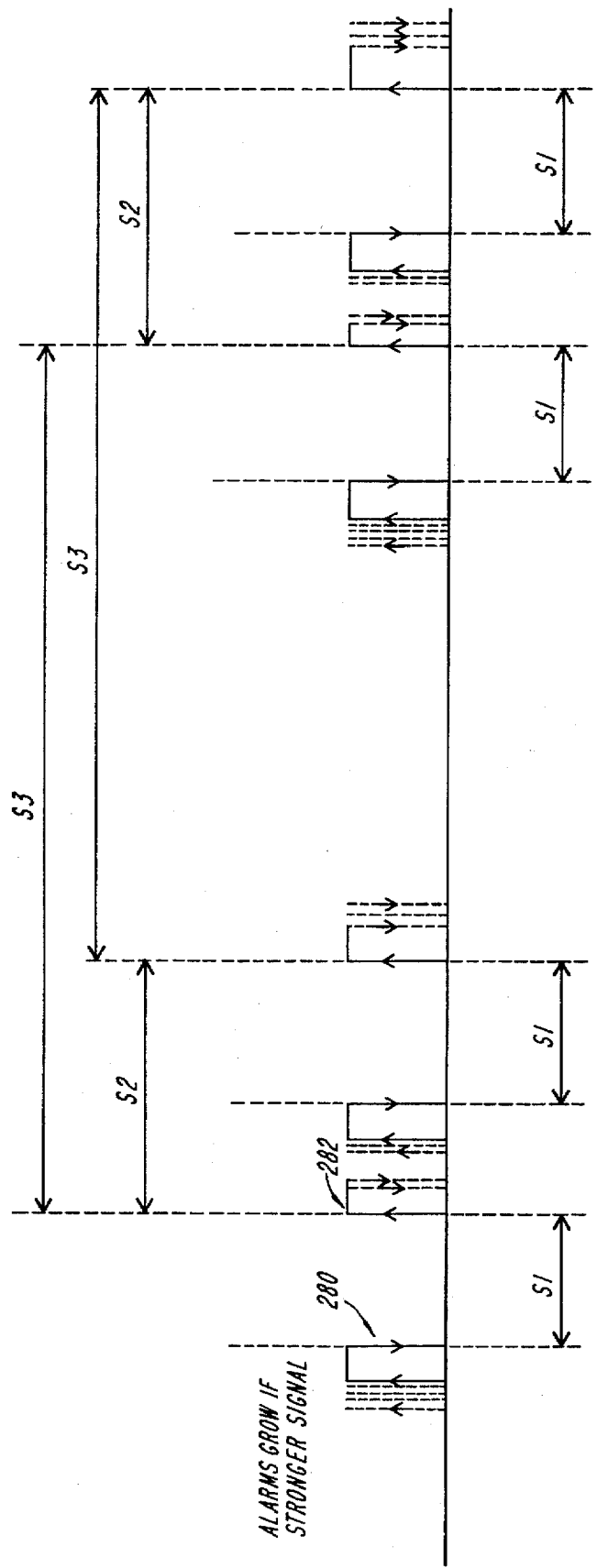
FIG. 12 is a plot illustrating the alarm pattern during a VCO receiver detection mode.

Referring now to FIGS. 11 and 12, it is known that there exist receiver circuits which are specifically provided to detect the presence of a radar detector circuit such as radar detector circuit 14 (FIG. 1). Such receiver circuits typically detect the presence of a radar detection circuit by detecting the first LO signal of the radar detector. Thus a person having such a receiver circuit is able to detect a vehicle equipped with a radar detector.

One particular type of such a receiver circuit includes an LO signal source having a swept signal source which provides a signal having a triangular shape. That is, the signal source sweeps between first and second different frequencies in a predetermined amount of time. Such receiver circuits are effective for determining the existence of radar detectors which use a fixed frequency oscillator.

The radar detector of the present invention, however, uses a swept frequency oscillator e.g. VCO 156 (FIG. 1) rather than a fixed frequency oscillator. Thus both the radar detector 14 (FIG. 1) of the present invention and the above specified receiver circuit sweep frequencies. Consequently, the LO signals of each system sweep past each other in time. Thus, with the present invention it is relatively difficult for such a receiver circuit to detect the presence of radar detector 14 since two frequencies are sweeping past each other.

Furthermore, as shown in FIG. 11, in the present invention every third sweep performed by VCO 156 includes a check sweep portion 270 during which the present invention operates as a fixed frequency device. That is, LO source 156 stops the sweep and emits a signal at a single frequency for a time period $T_{CS}$, which may, for example, typically be about 140 msec. Thus, radar detector 14 can receive the sweep signal emitted from the receiver circuit. Consequently, if the sweep rate, sweep frequency and modulation wave shape of the receiver circuit are known then the presence of the receiver circuit may be detected.

If no receiver circuit is detected then the radar detector returns to the normal radar sweep frequency mode of operation. If, however, a receiver circuit is detected then radar detector 14 provides an alarm signal, and radar detector 14 "goes to sleep" for a predetermined period of time. This may be accomplished for example, by tuning VCO 156 to provide a signal having a frequency outside the frequency range of the receiver circuit. VCO 156 would emit such a signal for a pre-determined period of time T corresponding to 20 seconds for example. After the predetermined period of time, the radar detector again attempts to determine if the receiver circuit is present. This sequence is repeated until radar detector 14 no longer detects the presence of the receiver. Radar detector 14 then returns to its normal processing mode and resumes it normal sweep steps.

Referring briefly to FIG. 12, the time spacing $S_1$ between a pair of un-JERKED signals 280, 282 resultant from a signal sweep performed by a receiver circuit allows the radar detector processor to compute the receiver circuit sweep rate. The time spacing designated $S_2$ is a result of the present constant VCO frequency. The time spacing $S_3$ may be used to compute the rate between which the receiver circuit repeats its sweep (i.e. the period). After the values $S_1$ and $S_3$ are computed they are compared with values indicative of a receiver circuit. If the $S_1$ and $S_3$ values match the threshold values, then the radar detector processor concludes that a receiver circuit has been detected. Thus both the $S_1$ and $S_3$ values are required to verify that the received signal is provided by a receiver circuit.

The leading edge of alarm signal 280 occurs at a relatively imprecisely defined point in time since it is dependent on the strength of the received signal. The falling edge of alarm signal 280 however, occurs at a relatively well defined point in time. In a similar manner, the leading edge of alarm signal 282 occurs at a relatively well defined point in time while the falling edge occurs at an imprecisely defined point in time. Thus, the spacing $S_1$ is measured from the falling edge of alarm signal 280 and the rising edge of alarm signal 282. Similarly the spacings $S_2$ and $S_3$ are measured between rising edges of alarm signals as shown. Those of ordinary skill in the art will recognize of course that either edge of the alarm signals may also be used as long as an accurate measurement may be made.

Figure 13:
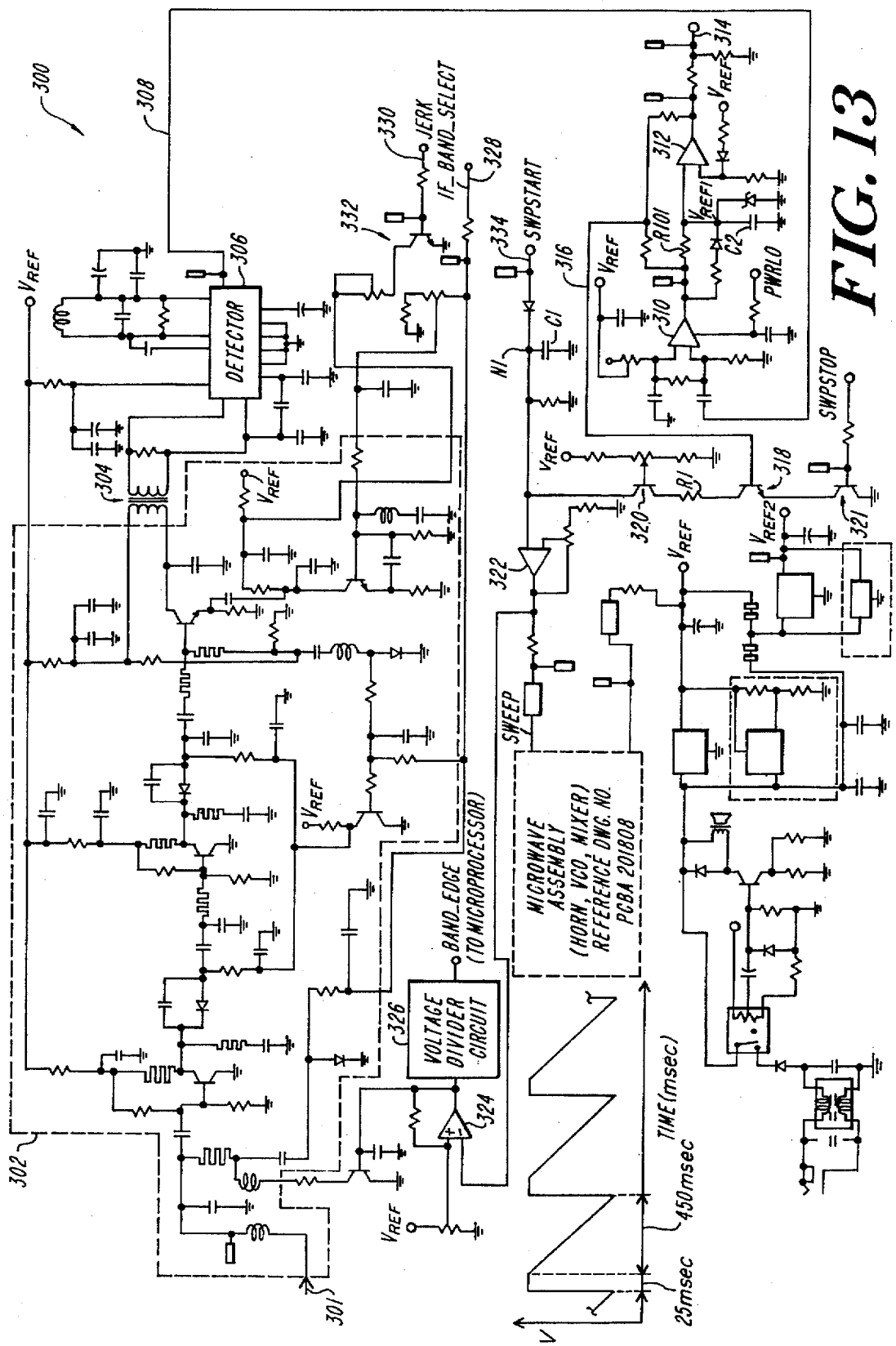
FIG. 13 is a schematic diagram of a radar detector circuit.

Referring now to FIG. 13 a radar detector circuit 300 includes an analog signal processing portion 302 which receives a signal from a microwave mixer at an input port 301. Analog processing circuit 302 couples an appropriately filtered and amplified signal through a transformer 304 to the input port of a detector 306. Detector 306 may be provided, for example, as an FM detector chip manufactured by ROHM and identified as part no. BA4111F.

FM detector chip 306 generates the so-called S-curve signals which are fed along a signal path 308 to the input port of a comparator 310. The output of comparator 310 is normally high and when the signal level of the S curve fed thereto reaches a predetermined threshold the signal level at the output port of comparator 310 is switched to a low state.

The output of comparator 310 is fed to an input port of a second comparator 312. A second input port of comparator 312 is coupled to a reference voltage $V_{REF}$. The output of comparator 312 is normally low, however when the signal fed from comparator 310 causes the output of comparator 312 to go high, an alarm signal is provided at terminal 314.

As mentioned above, the output of comparator 310 is normally high. However, when the output signal from comparator 310 goes low transistor 318 is biased into its nonconduction state and thus provides an open circuit impedance characteristic between transistor 320 and transistor 321.

When comparator 310 provides a low voltage signal the base electrode of transistor 318, goes low and transistor 318 is biased into its non-conduction state. This open circuits the constant current sink which is reducing the voltage on capacitor C1 such that the sweep voltage at the output port of the noninverting sweep amplifier 322 remains fixed at the voltage and consequently VCO frequency that initially generated the alarm signal. If the signal was above threshold, the analog sweep stop will remain until the voltage at the input to comparator 312 has decreased through resistor R101. Secondly, if the signal is strong enough to cause the discharge of capacitor C2 then comparator 312 changes state to indicate an alarm.

Band-edge comparator 324 is connected to the negative going sweep voltage and changes state (output goes high) typically about one-half way through the sweep. Thus band-edge comparator 324 has a first input port coupled to a reference potential and a second input port coupled to the output port of the sweep start amplifier 322.

Band-edge comparator 324 receives the signals fed thereto and provides a BAND_EDGE signal to the microprocessor through a voltage divider circuit 326 such that the output signal provided by band-edge comparator 324 is provided having a voltage level within a range accepted by the microprocessor.

The signal BAND_EDGE is provided at the output of band-edge voltage divider circuit 326. The reference voltage may be adjusted during a test mode to provide a logic level 1 output at a particular VCO tuning voltage which as described above in conjunction with FIG. 6 is selected to be near the midpoint tuning voltage of the VCO.

Alternatively as described in conjunction with FIG. 6A, the reference voltage may be adjusted during a test mode to provide a logic level 1 output at a particular point in time. In this case, the point in time should preferably be defined to be at the end of the K-band period.

The microprocessor provides an IF_BAND_SELECT signal to the analog signal processor 302 to thus switch the signal processing from the radar speed detector mode to the receiver circuit listening mode.

The microprocessor activates the IF_BAND_SELECT signal on two occasions. First, the IF_BAND_SELECT signal is activated to disable the second LO signal, to thus tune the receiver to about 11 MHz during the PRD sweep to verify a valid Ka-Band signal. Second, the microprocessor activates the IF_BAND_SELECT signal to position the IF band select at 11 MHz for the radar detector detector search.

The microprocessor also provides the JERK signal on an input terminal 330 through a transistor switch circuit 332 coupled to the analog signal processing circuit 302.

The microprocessor also provides a sweep start signal denoted SWPSTART at terminal 334 to the input port of sweep start amplifier 322. The sweep start signal SWP-START charges a capacitor C1 to a predetermined level. The capacitor is coupled between a node N1 and ground.

Transistor 320 is provided having a first electrode coupled to node N1, a second electrode coupled to a reference potential $V_{REF}$ and a third electrode coupled through a series resistor R1 to a first electrode of the transistor 318. Thus, when the capacitor is charged to a predetermined level transistor 320 is biased into its conduction state and thus provides a signal path to ground through transistors 318 and 321. The impedance characteristic of transistor 320 sets the slope of the sweep.

That is, the sweep start signal SWPSTART charges capacitor C1 to typically about 5.0 volts in the time interval of about 25 milliseconds. Transistor 320 collector terminal is a very high DC impedance the exact magnitude of which is controlled by the potentiometer coupled to the base of transistor 320. This very high impedance constitutes a constant current sink and the voltage at node N1 may be computed as $V_0 = (I_{amps} \times T_{Seconds})/C_{Farads}$ As mentioned above, when transistor 318 receives a low signal from comparator 310 transistor 318 is biased into its nonconduction state and thus provides an open circuit impedance characteristic between the third electrode of transistor 320 and ground.

The BAND_EDGE signal is provided from the output voltage divider circuit 326 and, as described above in conjunction with FIG. 6, is used to distinguish X-band signals from K-band signals because of the relative time relations between the two bands. As mentioned above, comparator 324 is adjusted in test to provide a high output signal at a particular point in the VCO tuning voltage or at a particular point in time as described in conjunction with FIG. 6A. If the timing approach is used then the time is selected to be at the end of the K-band detection region which corresponds to 229 msec as shown in FIG. 6. In the preferred embodiment, the point is selected to be at the midway voltage of the VCO voltage tuning range. The BAND_EDGE signal is thus also used to help differentiate between the K and X-band signals.

The BAND_EDGE signal is used to ensure that any jerk responses in timing that may have been generated during the time interval corresponding to the K-band time interval region are properly interpreted. That is, if a signal is generated that has some characteristics of a K-band signal and some characteristics not associated with a valid K-band signal and at 229 msec the BAND_EDGE signal came high the probability is that it is a K-band signal and the system is alarmed accordingly. Thus, the BAND_EDGE signal is also used to help distinguish between signals in the K and X frequency bands.

Figure 14:
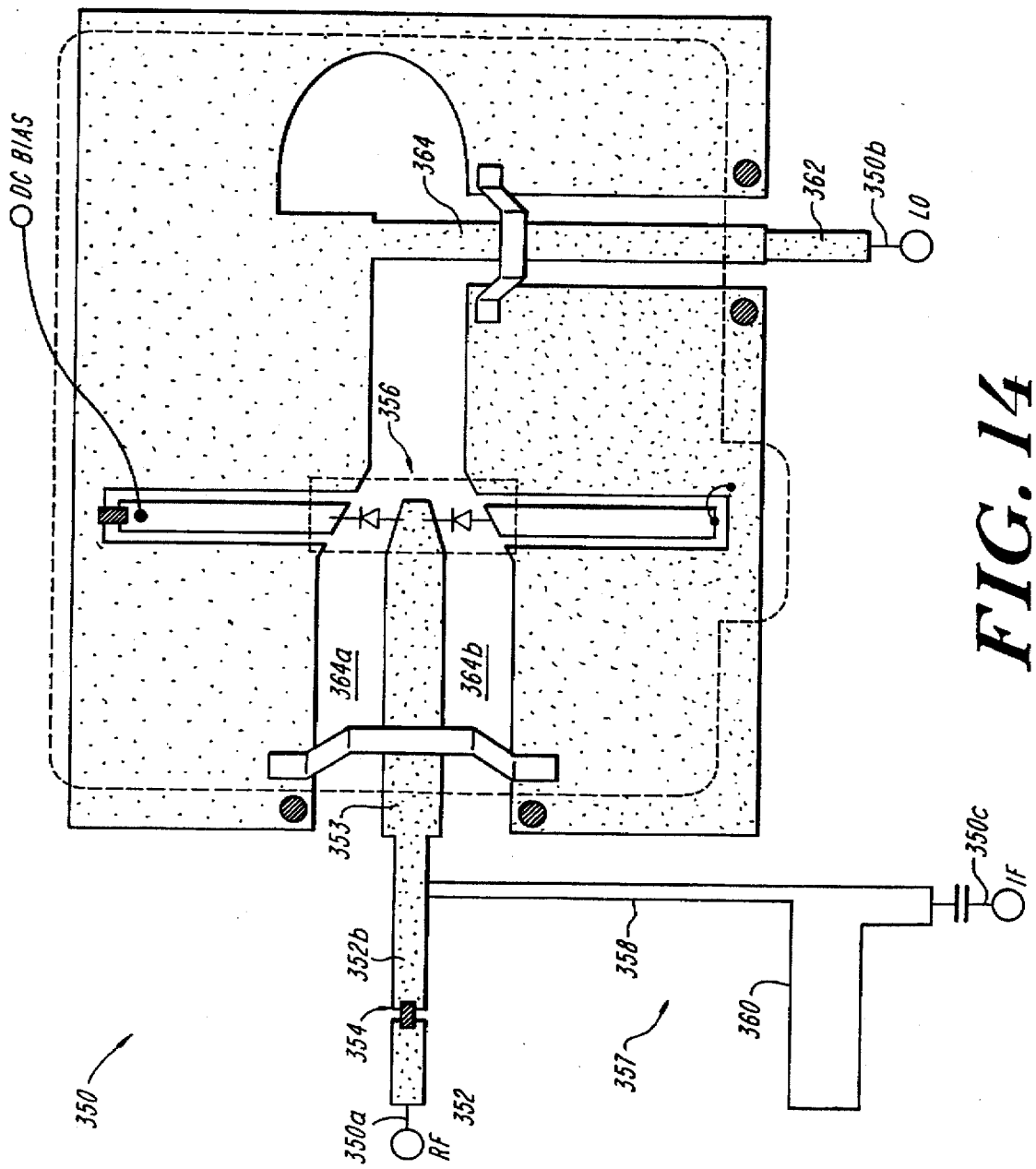
FIG. 14 is a schematic diagram of a mixer circuit.

Referring now to FIG. 14, a mixer 350 which may be of the type used in radar circuit 150 (FIG. 5) is shown having an RF input terminal 350a, an LO input terminal 350b and an IF output terminal 350c. The mixer 350 includes a first RF propagation network 352 provided from a pair of microstrip strip conductors coupled by a capacitor 354. A first end of the RF propagation network 352 is coupled to the RF input terminal 350A and a second end of the RF propagation network 352 is coupled to first end of a second RF propagation network here provided as a Co-planer waveguide transmission line. A second end of transmission line 353 is coupled to a first terminal of an antiparallel connected diode pair 356.

Mixer 350 further includes an IF output circuit 357. IF output circuit 357 includes a first transmission line resonator 358 having a relatively high impedance characteristic to signals at the RF and LO frequencies. A transmission line resonator 360 selected having a length such that RF frequency signals are prevented from propagating to the output port 350c is coupled to transmission line 358.

The LO signal is fed to the input terminal 350b along a 50 ohm microstrip transmission line 362. Microstrip transmission line 362 is then coupled to a co-planer wave guide transmission line 364. The LO signal propagates along the co-planer wave guide transmission line 364. The LO signal propagates along transmission line 164 having a known field configuration. Co-planar transmission line 364 branches into section 364a, 364b at the connection point with the antiparallel diode pair 356. Thus, in this instance the field configuration is such that the local oscillator signal propagating on each of the branches have an orthogonal phase relationship. Thus, any leakage of the local oscillator signal propagating toward RF terminal 350a is cancelled due to the orthogonal phase relationship propagating between the two branch arms. Thus, there is substantially no LO leakage signal at the RF port 350a.

Therefore, when a radar detector such as that shown in FIG. 1 is provided having mixer 350, radar detector 14 becomes nondetectable by the aforementioned receiver circuits described in conjunction with FIGS. 11 and 12 because the radiated signals which could be detected by such receiver circuits are suppressed in mixer 350. This is true regardless of whether the receiver circuit is listening for signals at the LO fundamental frequency or for signals having a frequency corresponding to a harmonic of the LO signal frequency.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. A method of operating a radar detector having a swept VCO to detect the presence of a receiver circuit, the method including the steps of:

stopping the sweep of the VCO at a predetermined time;

tuning the VCO to emit a signal at a single fixed frequency for a predetermined time period;

detecting a signal having a changing frequency;

determining if said detected signal has a predetermined signal characteristic; and in response to said determining step, if the detected signal has the predetermined signal characteristic then operating the VCO such that the VCO does not emit a signal which is detectable by the receiver circuit.

2. The method of claim 1 wherein the step of operating the VCO such that the VCO does not emit a signal which is detectable by the receiver circuit includes the step of tuning the VCO to emit a signal which is not detectable by the receiver circuit.

3. The method of claim 1 wherein prior to said stopping step, performing the step of:

periodically sweeping the VCO between a first frequency and a second different frequency and wherein the steps of stopping the sweep of the VCO at the predetermined time and emitting the signal at the single frequency for the predetermined time period are performed during a predetermined one of the periodic sweeps.

4. The method of claim 3 wherein the VCO emits the signal at the single frequency for a time period in the range of 140 to 215 milliseconds.

5. The method of claim 1 wherein the step of operating the VCO such that the VCO does not emit a signal which is detectable by the receiver circuit includes the step of tuning the VCO to emit a signal outside the frequency range of the receiver circuit.

6. The method of claim 3 wherein in response to said determining step, if the detected signal does not have the predetermined signal characteristic then returning to the step of periodically sweeping between the first frequency and the second different frequency.

7. The method of claim 3 wherein the step of operating the VCO such that the VCO does not emit a signal which is detectable by the receiver circuit includes the step of:

tuning the VCO to emit a non-detectable signal having a frequency outside the range of frequencies between the first frequency and the second frequency wherein the VCO emits the non-detectable signal for a predetermined period of time.

8. The method of claim 7 wherein after the step of emitting the non-detectable signal for the pre-determined period of time performing the steps of:

tuning the VCO to emit the signal at the single frequency; and determining if a received signal has the predetermined signal characteristics.

9. A radar detector having a circuit for detecting a signal having a changing frequency emitted by a receiver circuit, the circuit comprising:

first means, coupled to a local oscillator signal source, said first means for periodically changing the frequency of a local oscillator signal emitted by the local oscillator signal source between a first frequency and a second different frequency;

second means, coupled to said first means, said second means for stopping the sweep of the local oscillator signal source at a predetermined time during a predetermined one of the periodic sweeps such that the local oscillator signal source emits a signal at a single frequency for a predetermined time period;

third means, coupled to said second means, said third means for detecting the signal having a changing frequency emitted by the receiver circuit; and fourth means, coupled to said third means, said fourth means for controlling the local oscillator signal source such that in response to said third means detecting the signal from the receiver circuit, said fourth means controls the local oscillator signal source such that the radar detector does not emit a signal detectable by the receiver circuit.

10. The circuit of claim 9 wherein said third means comprises:

means for demodulating the received signal; and means for determining if the received signal has a predetermined signal characteristic.

11. The circuit of claim 10 wherein said second means periodically stops changing the frequency of the local oscillator signal source such that the local oscillator signal source emits the signal at the single frequency for the predetermined time period.

12. The circuit of claim 11 wherein after the local oscillator signal source emits the signal at the single frequency for the predetermined time period, if said third means detects the presence of a signal emitted by the receiver circuit then said fourth means tunes the local oscillator signal source to provide a non-detectable signal having a frequency outside the range of frequencies between the first frequency and the second frequency wherein the local oscillator signal source emits the non-detectable signal for a pre-determined period of time.

13. The circuit of claim 12 wherein after the local oscillator signal source emits the non-detectable signal for the predetermined period of time said fourth means tunes the local oscillator signal source to emit the signal at the single frequency; and said means for detecting determines if the signal from the receiver circuit is present.

14. A radar detector comprising:

a VCO;

a tuning circuit, coupled to the VCO, said tuning circuit for providing a sweep signal to said VCO such that said VCO provides a signal which periodically sweeps between a first frequency and a second different frequency;

a processor, coupled to said tuning circuit, wherein in response to a signal from said processor, said tuning circuit stops the sweep of said VCO at a predetermined time such that said VCO emits a signal at a single frequency for a predetermined time period; and a detector circuit, coupled to said processor, said detector circuit for detecting a signal having a predetermined signal characteristic, and wherein in response to said detector circuit detecting a signal having the predetermined signal characteristic, said tuning circuit stops the sweep signal and tunes said VCO to emit a signal having a frequency outside the frequency range between the first frequency and the second frequency.

15. The radar detector of claim 14 wherein said detector circuit comprises:

a demodulator circuit for demodulating the received signal; and a detector diode for detecting the received signal thereby detecting the presence of the receiver circuit.

16. The radar detector of claim 15 wherein said VCO emits the signal having the frequency outside the frequency range between the first frequency and the second frequency for a predetermined time period.

17. The radar detector of claim 16 wherein after said VCO emits the signal having the frequency outside the frequency range between the first frequency and the second frequency for the predetermined time period, said tuning circuit tunes the VCO to emit a signal at the single frequency.

18. The radar detector of claim 17 wherein after said VCO emits the signal at the single frequency, said detector circuit determines if a signal having the predetermined signal characteristic is present.

* * * * *

UNITED STATES PATENT AND TRADEMARK OFFICE
CERTIFICATE OF CORRECTION

PATENT NO. : 5,666,120
DATED : September 9, 1997
INVENTOR(S) : Kline et al

It is certified that error appears in the above-identified patent and that said Letters Patent is hereby corrected as shown below:

On the title page: Item [75] Inventors: delete "Subhash C. Sakar".

Signed and Sealed this

Sixth Day of January, 1998

Attest:

BRUCE LEHMAN

*Attesting Officer*  *Commissioner of Patents and Trademarks*